(12) United States Patent
Liu et al.

(10) Patent No.: US 10,863,367 B2
(45) Date of Patent: *Dec. 8, 2020

(54) REFERENCE SIGNAL SEQUENCE CONFIGURATION METHOD AND NETWORK DEVICE

(71) Applicant: HUAWEI TECHNOLOGIES CO., LTD., Guangdong (CN)

(72) Inventors: Kunpeng Liu, Beijing (CN); Liang Xia, Shenzhen (CN); Yuan Xia, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/196,268

(22) Filed: Nov. 20, 2018

(65) Prior Publication Data

US 2019/0090142 A1    Mar. 21, 2019

Related U.S. Application Data

(63) Continuation of application No. 15/606,576, filed on May 26, 2017, now Pat. No. 10,154,421, which is a
(Continued)

(30) Foreign Application Priority Data

Jun. 3, 2011    (CN) .......................... 2011 1 0149706

(51) Int. Cl.
*H04L 12/66*    (2006.01)
*H04W 24/02*    (2009.01)
(Continued)

(52) U.S. Cl.
CPC ............. *H04W 24/02* (2013.01); *H04J 13/10* (2013.01); *H04L 25/0226* (2013.01)

(58) Field of Classification Search
CPC ..... H04W 24/02; H04W 72/00; H04W 72/04; H04W 72/042
See application file for complete search history.

(56) References Cited

U.S. PATENT DOCUMENTS 8,842,620 B2    9/2014   Zhang et al.
8,842,622 B2 *  9/2014   Zhang .................... H04B 7/024
                                              370/329
(Continued)

FOREIGN PATENT DOCUMENTS

CN       101068135 A     11/2007
CN       101938296 A     1/2011
(Continued)

OTHER PUBLICATIONS

U.S. Appl. No. 14/095,152, filed Dec. 3, 2013, Kunpeng Liu et al., Huawei Technologies Co., Ltd.
(Continued)

*Primary Examiner* — Abdelnabi O Musa
(74) *Attorney, Agent, or Firm* — Leydig, Voit & Mayer, Ltd.

(57) ABSTRACT

A reference signal sequence configuration method includes: selecting, by a network device and from candidate IDs, an ID used for generating a reference signal initialization sequence for a terminal, where the candidate IDs include at least two IDs, and the selected ID does not include a scrambling ID; and generating a reference signal initialization sequence for the terminal according to the selected ID. An implementation manner of the present invention further provides a network device. In the reference signal sequence configuration method and the network device, a reference signal initialization sequence is generated according to the
(Continued)

selected ID, thereby providing a manner of generating a reference signal initialization sequence different from the manner in the prior art.

18 Claims, 5 Drawing Sheets

Related U.S. Application Data continuation of application No. 14/095,152, filed on Dec. 3, 2013, now Pat. No. 9,681,312, which is a continuation of application No. PCT/CN2012/076448, filed on Jun. 4, 2012.

(51) Int. Cl.
*H04J 13/10* (2011.01)
*H04L 25/02* (2006.01)

(56) References Cited

U.S. PATENT DOCUMENTS

| | | | |
|---|---|---|---|
| 9,681,312 B2 | 6/2017 | Liu et al. | |
| 2010/0165882 A1* | 7/2010 | Palanki | H04W 76/14 370/254 |
| 2010/0172286 A1 | 7/2010 | Yoshii et al. | |
| 2010/0272040 A1 | 10/2010 | Nam et al. | |
| 2011/0038310 A1 | 2/2011 | Chimiel et al. | |
| 2011/0085503 A1* | 4/2011 | Nam | H04L 5/005 370/329 |
| 2011/0103250 A1 | 5/2011 | Li et al. | |
| 2012/0033540 A1* | 2/2012 | Kim | H04B 7/0413 370/203 |
| 2012/0170679 A1 | 7/2012 | Koo et al. | |
| 2014/0211754 A1 | 7/2014 | Li et al. | |
| 2015/0139079 A1* | 5/2015 | Zhu | H04L 5/0035 370/329 |

FOREIGN PATENT DOCUMENTS

| | | |
|---|---|---|
| CN | 102055519 A | 5/2011 |
| CN | 102056313 A | 5/2011 |
| WO | 2011047351 A2 | 4/2011 |

OTHER PUBLICATIONS

U.S. Appl. No. 15/606,576, filed May 26, 2017, Kunpeng Liu et al., Huawei Technologies Co., Ltd.
Notice of Allowance, dated Jul. 25, 2018, in U.S. Appl. No. 15/606,576 (27 pp.).
Office Action, dated Mar. 16, 2018, in U.S. Appl. No. 15/606,576 (20 pp.).
Office Action, dated Oct. 6, 2017, in U.S. Appl. No. 15/606,576 (25 pp.).
Office Action, dated Nov. 23, 2015, in U.S. Appl. No. 14/095,152 (34 pp.).
Office Action, dated Apr. 22, 2016, in U.S. Appl. No. 14/095,152 (30 pp.).
Final Office Action, dated Oct. 20, 2016, in U.S. Appl. No. 14/095,152 (9 pp.).
Notice of Allowance, dated Feb. 8, 2017, in U.S. Appl. No. 14/095,152 (10 pp.).
International Search Report, dated Sep. 27, 2012, in International Application No. PCT/CN2012/076448 (4 pp.).
Written Opinion of the International Searching Authority, dated Sep. 27, 2012, in International Patent Application No. PCT/CN2012/076448 (11 pp.).
Extended European Search Report, dated Apr. 7, 2014, in European Application No. 12793971.8 (8 pp.).
Chinese Search Report dated Jun. 19, 2014 in Chinese Patent Application No. 201110149706.0 (2 pp.).
Chinese Office Action dated Jun. 27, 2014 in Chinese Patent Application No. 201110149706.0 (6 pp.).
Korean Office Action dated Mar. 16, 2015 in Korean Patent Application No. 10-2013-7034076 (7 pp.).
European Office Action dated Oct. 22, 2015 in European Patent Application No. 12793971.8 (12 pp.).
"6.10.3 UE-specific reference signals" and "6.10.3.1 Sequence generation" (1 pg.).
"3rd Generation Partnership Project; Technical Specification Group Radio Access Network; Evolved Universal Terrestrial Radio Access (E-UTRA); Physical Channels and Modulation (Release 10)", 3GPP TS 36.211, V10.1.0, Mar. 2011, pp. 1-103.
"Scrambling Sequence Initialisation," 3GPP TSG-RAN Working Group 1 #52, Tdoc R1-080940, Sorrento Italy, Feb. 11-15, 2008, XP50109412 (4 pp.).
"Considerations on Initialization and Mapping of DM-RS Sequence," 3GPP TSG RAN WG1 #58 Meeting, R1-093304, Shenzhen, China, Aug. 24-28, 2009, XP50351628 (4 pp.).
"Scrambling sequence for CoMP," Samsung, 3GPP TSG RAN WG1 meeting #60, R1-101178, San Francisco, USA, Feb. 22-26, 2010 (3 pp.).
"3rd Generation Partnership Project; Technical Specification Group Radio Access Network; Evolved Universal Terrestrial Radio Access (E-UTRA); Multiplexing and channel coding (Release 10)," 3GPP TS 36.212 V10.1.0 (Mar. 2011), pp. 1-76.
"3rd Generation Partnership Project; Technical Specification Group Radio Access Network; Evolved Universal Terrestrial Radio Access (E-UTRA); Radio Resource Control (RRC); Protocol specification (Release 10)," 3GPP TS 36.331 V10.10.1.0 (Mar. 2011), pp. 1-290.

* cited by examiner

REFERENCE SIGNAL SEQUENCE CONFIGURATION METHOD AND NETWORK DEVICE

CROSS-REFERENCE TO RELATED APPLICATIONS

This application is a continuation of U.S. patent application Ser. No. 15/606,576, filed on May 26, 2017, which is a continuation of U.S. patent application Ser. No. 14/095,152, filed on Dec. 3, 2013, now U.S. Pat. No. 9,681,312, which is a continuation of International Application No. PCT/CN2012/076448, filed on Jun. 4, 2012, which claims priority to Chinese Patent Application No. 201110149706.0, filed on Jun. 3, 2011. All of the afore-mentioned patent applications are hereby incorporated by reference in their entireties.

TECHNICAL FIELD

The present application relates to the field of mobile communication wireless transmission technologies, and in particular, to a reference signal sequence configuration method and a network device.

BACKGROUND

In a long term evolution-advanced (LTE-A) R10 protocol, an evolved base station (eNB) sends a downlink demodulation reference signal to a terminal (User Equipment), and the terminal uses the downlink demodulation reference signal (DMRS) to perform channel estimation, so as to perform data demodulation. A DMRS sequence is generated through the following formula:

$$r(m) = \frac{1}{\sqrt{2}}(1 - 2 \cdot c(2m)) + j\frac{1}{\sqrt{2}}(1 - 2 \cdot c(2m + 1)), \quad \text{Formula 1}$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

In Formula 1, r(m) is a DMRS sequence, $N_{RB}^{max,DL}$ is the number of resource blocks included in the maximum system bandwidth among all system bandwidths, and c(2m) and c(2m+1) are determined by the following Formula 2:

$$c(n) = (x_1(n+N_C) + x_2(n+N_C)) \bmod 2$$

$$x_1(n+31) = (x_1(n+3) + x_1(n)) \bmod 2 \quad \text{Formula 2}$$

$$x_2(n+31) = (x_2(n+3) + x_2(n+2) + x_2(n+1) + x_2(n)) \bmod 2$$

In Formula 2, $N_C = 1600$, $x_1(0) = 1$, $x_1(n) = 0$, and $n=1, 2 \ldots, 30$.

$c_{init} = \sum_{i=0}^{30} x_2(i) \cdot 2^i$, which is an initialization sequence of $x_2$. Specifically, a formula for generating $C_{init}$ ($C_{init}$ is referred to as a reference signal initialization sequence in the following) is:

$$c_{init} = (\lfloor n_s/2 \rfloor + 1) \cdot (2N_{ID}^{cell} + 1) \cdot 2^{16} + n_{SCID}$$

In the formula, $n_s$ is a time slot number $N_{ID}^{cell}$ is a cell identifier (ID), and $n_{SCID}$ is a scrambling ID.

As can be seen from the above formula, currently, a manner of generating a reference signal initialization sequence by a system is limited.

SUMMARY

A reference signal sequence configuration method and a network device are provided.

A provided reference signal sequence configuration method includes:

selecting, by a network device and from candidate identifiers IDs, an ID used for generating a reference signal initialization sequence for a terminal, where the candidate IDs include at least two IDs, and the selected ID does not include a scrambling ID; and generating a reference signal initialization sequence for the terminal according to the selected ID.

A provided network device includes:

an ID selection module, configured to select, from candidate IDs, an ID used for generating a reference signal initialization sequence for a terminal, where the candidate IDs include at least two IDs, and the selected ID does not include a scrambling ID; and a reference signal initialization sequence generation module, configured to generate a reference signal initialization sequence for the terminal according to the ID selected by the ID selection module.

In the reference signal sequence configuration method and the network device, an ID used for generating a reference signal initialization sequence is selected from at least two candidate IDs, the selected ID does not include a scrambling ID, and the reference signal initialization sequence is generated according to the selected ID, thereby providing a manner for generating a reference signal initialization sequence different from the manner in the prior art.

DESCRIPTION OF EMBODIMENTS

In order to make the objectives, technical solutions and advantages of the present invention clearer the present invention is further described in detail with reference to the accompanying drawings.

Figure 1:
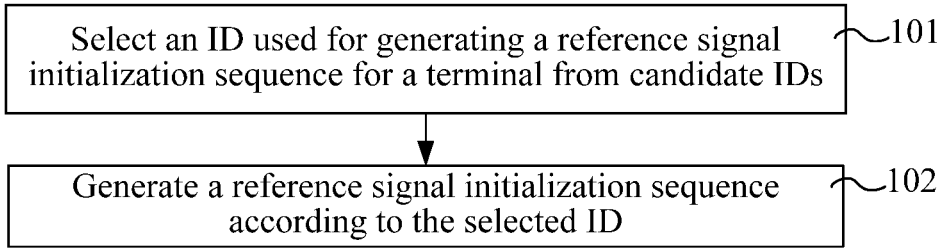
FIG. 1 is a flow chart of an embodiment of a reference signal sequence configuration method according to the present invention.

As shown in FIG. 1, in an embodiment of a reference signal sequence configuration method according to the present invention, the following steps are included.

Step 101: A network device, which includes a base station or a terminal, selects, from candidate IDs, an ID used for generating a reference signal initialization sequence for a terminal, where the candidate IDs include at least two IDs, and the selected ID does not include a scrambling ID.

Step 102: Generate a reference signal initialization sequence for the terminal according to the selected ID.

Figure 2:
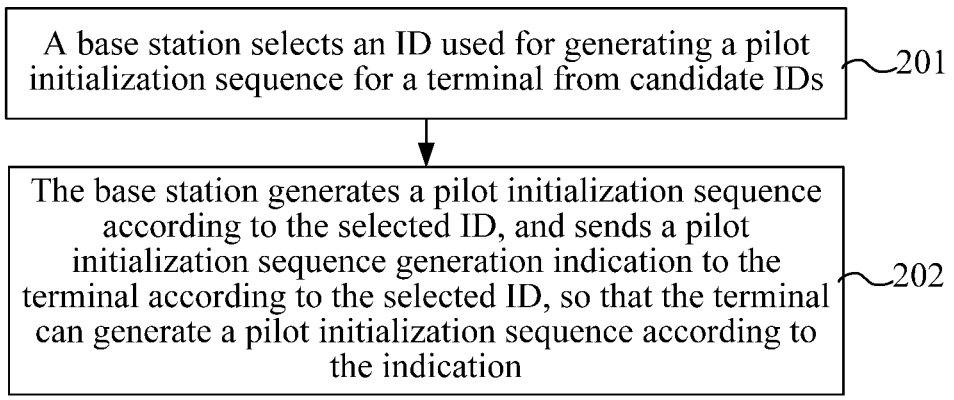
FIG. 2 is a flow chart of an embodiment of a reference signal sequence configuration method at a base station side according to the present invention.

When the network device is a base station, as shown in FIG. 2, a specific process may include the following steps.

Step S201: The base station selects, from candidate IDs, an ID used for generating a reference signal initialization sequence for a terminal, where the candidate IDs include at least two IDs, and the selected ID does not include a scrambling ID either.

Step 202: The base station generates a reference signal initialization sequence according to the selected ID, and sends a reference signal initialization sequence generation indication to the terminal according to the selected ID, so that the terminal can generate a reference signal initialization sequence according to the indication.

In an implementation manner, a formula for the base station to generate a reference signal initialization sequence for the terminal is:

$$c_{init}=(\lfloor n_s/2 \rfloor+1)\cdot(2N_{ID}+1)\cdot 2^{16}+n_{SCID} \qquad \text{Formula 3,}$$

$n_s$ is a time slot number, $n_{SCID}$ is a scrambling ID, and $N_{ID}$ is the ID used for generating the reference signal initialization sequence and selected for the terminal from the candidate IDs. The candidate IDs include: a combination of any two or any more than two of a cell ID, an RRH ID, a cell group ID, an RRH group ID, a terminal group ID, a CSI-RS ID, a CSI-RS group ID, an antenna cluster ID, and one or more than one constant ID. In manners of the following embodiments, unless otherwise described, the candidate IDs include the same content as that described herein.

In the base station, correspondence between scrambling IDs and candidate IDs may be configured, and correspondence between the scrambling IDs and port signaling is configured through a DMRS port signaling table in the base station. According to the ID selected for the terminal, a DMRS port configuration table in the base station, and the correspondence between scrambling IDs and candidate IDs, the base station may determine DMRS port signaling to be sent to the terminal. In step 202, the reference signal initialization sequence generation indication sent to the terminal is the determined DMRS port signaling. Herein, similar to that in the prior art, two scrambling IDs are included, that is, 0 and 1, and the number of corresponding candidate IDs is also two. In the embodiment of the present invention, the scrambling IDs may be expanded. For example, the scrambling IDs are expanded to four, and the number of corresponding candidate IDs may also be four.

Alternatively, in the base station, correspondence between ID indication identifier values (that is, Y in subsequent specific embodiments) and candidate IDs may be configured, and according to the ID selected for the terminal and the correspondence between ID indication identifier values and candidate IDs, the base station determines an ID indication identifier value, and set the ID indication identifier value in dedicated ID selection indication signaling. In step 202, the reference signal initialization sequence generation indication sent to the terminal is the dedicated ID selection indication signaling in which the ID indication identifier value is set. Herein, the dedicated ID selection indication signaling may be dynamic signaling, for example, new data indicator (NDI) signaling of a disabled transmission block (TB). Herein, two ID indication identifier values Y, for example, 0 and 1, may be configured, and the number of corresponding candidate IDs is also two. More than two ID indication identifier values Y may also be configured; for example, Y is expanded to four values, which are 00, 01, 10, and 11, and the number of corresponding candidate IDs may also be four.

In another implementation manner, a formula for the base station to generate a reference signal initialization sequence for the terminal is:

$$c_{init}=(\lfloor n_s/2 \rfloor+1)\cdot(2N_{ID1}+1)\cdot 2^{16}+XN_{ID2}+n_{SCID} \qquad \text{Formula 4,}$$

In Formula 4, $n_s$ is a time slot number, X is a positive integer greater than or equal to 1, and $n_{SCID}$ is a scrambling ID.

In Formula 4, a value of one of $N_{ID1}$ and $N_{ID2}$ may be 0, and the other is the ID used for generating the reference signal initialization sequence and selected for the terminal from the candidate IDs. It is also acceptable that $N_{ID1}$ and $N_{ID2}$ are both IDs used for generating a reference signal initialization sequence and selected for the terminal from the candidate IDs, that is, two IDs are selected for the terminal from the candidate IDs, and the two IDs may be the same or different.

Similar to the manner of the foregoing embodiment, the base station may also indicate the ID selected for the terminal to the terminal through DMRS port signaling or dedicated ID selection indication signaling. However, correspondence, configured in the base station, between a scrambling ID or Y and an ID selected for the terminal is different. For example, when the candidate IDs include two IDs, namely, a Cell ID (which may specifically be a cell ID, an RRH ID, or a CSI-RS ID) and a Group ID (which may specifically be a cell group ID, a terminal group ID, an RRH group ID, an antenna cluster ID, or a CSI-RS group ID), for the manner of indication through the DMRS port signaling, the configured correspondence may be:

$$n_{SCID}=0, \quad N_{ID1}=N_{ID}^{Cell}, N_{ID2}=N_{ID}^{Group}$$
$$n_{SCID}=1, \quad N_{ID1}=N_{ID}^{Cell}, N_{ID2}=0 \qquad \text{or}$$

$$n_{SCID}=0, \quad N_{ID1}=N_{ID}^{Cell}, N_{ID2}=0$$
$$n_{SCID}=1, \quad N_{ID1}=0, N_{ID2}=N_{ID}^{Group} \qquad .$$

For the manner of indication through the dedicated ID selection indication signaling, the configured correspondence may be:

$$\begin{cases} Y=0, & N_{ID1}=N_{ID}^{Cell}, N_{ID2}=0 \\ Y=1, & N_{ID1}=0, N_{ID2}=N_{ID}^{Group} \end{cases} \text{or}$$

$$\begin{cases} Y=0, & N_{ID1}=N_{ID}^{Cell}, N_{ID2}=N_{ID}^{Group} \\ Y=1, & N_{ID1}=N_{ID}^{Cell}, N_{ID2}=0 \end{cases}.$$

In yet another implementation manner, a formula for the base station to generate a reference signal initialization sequence for the terminal is:

$$c_{init}=(\lfloor n_s/2 \rfloor+1)\cdot(2N_{ID1}+1)\cdot 2^{16}+ZN_{ID3}+n_{SCID} \qquad \text{Formula 5}$$

$n_s$ is a time slot number, Z is a positive integer greater than or equal to 1, and $n_{SCID}$ is a scrambling ID.

In Formula 5, it is acceptable that $N_{ID1}$ is a fixedly configured ID, where the fixedly configured ID is: a cell ID, an RRH ID, a cell group ID, an RRH group ID, a terminal group ID, a CSI-RS ID, a CSI-RS group ID, an antenna cluster ID, or a constant ID; and $N_{ID3}$ is an ID selected by the base station for the terminal from third ID candidate values. The third ID candidate values include: a combination of any two or any more than two of an RRH ID, a cell group ID, an RRH group ID, a terminal group ID, a CSI-RS ID, a CSI-RS group ID, an antenna cluster ID, and one or more than one constant ID. The third ID candidate values may also be two or more than two IDs in the form of constants. The base station may semi-statically notify a UE of one or more of the third ID candidate values through UE specific high-layer signaling, for example, through dedicated signaling in radio resource control (RRC) signaling. In this scenario, the base station may assign different third ID candidate values to different UEs, and may also assign the same candidate value of the third ID to different UEs. Alternatively, the third ID candidate values include: two or more than two terminal group related IDs, or the third ID candidate values include: two or more than two CSI-RS group related IDs, or the third ID candidate values include: two or more than two antenna cluster related IDs. In the latter three situations, the base station may deliver parameter information for generating the ID candidate values to the terminal, for example, deliver the parameter information for generating the ID candidate values to the terminal through the UE specific high-layer signaling. According to the parameter information and the same formula set in the base station and the terminal, the base station and the terminal each generate two or more than two IDs related to the parameter information. For example, when the sent parameter information is CSI-RS information, a generated ID is referred to as a CSI-RS related ID or a CSI-RS group related ID; when the sent parameter information is user group information, a generated ID is referred to as a terminal group related ID; and when sent parameter information is antenna cluster information, a generated ID is referred to as an antenna cluster related ID. Alternatively, the third ID candidate values may also be fixedly configured in the base station or the terminal. Alternatively, the third ID candidate values may also be a combination of the foregoing IDs in various possible forms. For example, the third ID candidate values include one ID generated according to a parameter and an ID sent through high-layer signaling, or the third ID candidate values include one or two of the candidate IDs, and further include one ID generated according to a parameter. Possible specific combination manners are not listed herein.

Similar to the manner of the foregoing embodiment, the base station may also indicate $N_{ID3}$ selected for the terminal to the terminal through DMRS port signaling or dedicated ID selection indication signaling.

Alternatively, in Formula 5, it is also acceptable that $N_{ID3}$ is a fixedly configured ID, where the fixedly configured ID is: a cell ID, an RRH ID, a cell group ID, an RRH group ID, a terminal group ID, a CSI-RS ID, a CSI-RS group ID, an antenna cluster ID, or a constant ID; and $N_{ID1}$ is an ID selected for the terminal from first ID candidate values, where the first ID candidate values include: a combination of any two or any more than two of the cell ID, the RRH ID, the cell group ID, the RRH group ID, the terminal group ID, the CSI-RS ID, the CSI-RS group ID, the antenna cluster ID, and one or more than one constant ID.

Similar to the manner of the foregoing embodiment, the base station may also indicate $N_{ID1}$ selected for the terminal to the terminal through DMRS port signaling or dedicated ID selection indication signaling.

Alternatively, in Formula 5, it is also acceptable that $N_{ID1}$ is an ID selected for the terminal from first ID candidate values, where the first ID candidate values include: a combination of any two or any more than two of a cell ID, an RRH ID, a cell group ID, an RRH group ID, a terminal group ID, a CSI-RS ID, a CSI-RS group ID, an antenna cluster ID, or a constant ID; and $N_{ID3}$ is an ID selected by the base station for the terminal from third ID candidate values, where the third ID candidate values are the same as the third ID candidate values described above, which are not described herein again.

$N_{ID1}$ and $N_{ID3}$ may be indicated to the terminal through DMRS port signaling and dedicated ID selection indication signaling. Correspondence between scrambling codes and the first ID candidate values (which may also be replaced with the third ID candidate values) and correspondence between Y and the third ID candidate values (which may also be replaced with the first ID candidate values as is corresponding to the solution in the previous brackets) are set in the base station. The base station determines a corresponding scrambling code and ID indication identifier value according to the selected $N_{ID1}$ and $N_{ID3}$ respectively, and further determines corresponding DMRS port signaling according to the scrambling code and a DMRS port configuration table, and then sends the determined DMRS port signaling and dedicated ID selection indication signaling which carries the ID indication identifier value.

Alternatively, the base station may also indicate $N_{ID1}$ and $N_{ID3}$ by carrying two ID indication identifier values in dedicated ID selection indication signaling. Correspondence between first ID indication identifier values and the first ID candidate values and correspondence between second ID indication identifier values and the third ID candidate values are set in the base station, and a first ID indication identifier value and a second ID indication identifier value are determined according to the selected $N_{ID1}$ and $N_{ID3}$ respectively, and the first ID indication identifier value and the second ID indication identifier value are set in different specific information elements or different specific bit positions in dedicated ID selection indication signaling, and sent to the terminal.

Alternatively, in Formula 5, it is also acceptable that $N_{ID1}$ and $N_{ID3}$ are both fixedly configured IDs, and $N_{ID1}$ and $N_{ID3}$ may be configured into: any two different IDs or one same ID among a cell ID, an RRH ID, a cell group ID, an RRH group ID, a terminal group ID, a CSI-RS ID, a CSI-RS group ID, an antenna cluster ID, or a constant ID.

In yet another manner of the embodiment, a formula for the base station to generate a reference signal initialization sequence for the terminal is:

$$c_{init}=(\lfloor n_s/2 \rfloor +1)\cdot(2N_{ID1}+1)\cdot 2^{16}+XN_{ID2}+ZN_{ID3}+n_{SCID} \quad \text{Formula 5}$$

$n_s$ is a time slot number, X and Z are both positive integers greater than or equal to 1, and $n_{SCID}$ is a scrambling ID.

In Formula 6, it is acceptable that $N_{ID1}$ is a fixedly configured ID, where the fixedly configured ID is: 0 or any one of a cell ID, an RRH ID, a cell group ID, an RRH group ID, a terminal group ID, a CSI-RS ID, a CSI-RS group ID, an antenna cluster ID, or a constant ID; $N_{ID2}$ is a fixedly configured ID, where the fixedly configured ID is: a cell ID, an RRH ID, a cell group ID, an RRH group ID, a terminal group ID, a CSI-RS ID, a CSI-RS group ID, an antenna cluster ID, or a constant ID; and $N_{ID3}$ is an ID selected by the base station for the terminal from third ID candidate values, where the third ID candidate values are the same as the third ID candidate values in the foregoing manner of the embodiment. Similar to the manner of the foregoing embodiment, the base station may also indicate $N_{ID3}$ selected for the terminal to the terminal through DMRS port signaling or dedicated ID selection indication signaling.

In Formula 6, it is also acceptable that $N_{ID3}$ is a fixedly configured ID, where the fixedly configured ID is: a cell ID, an RRH ID, a cell group ID, an RRH group ID, a terminal group ID, a CSI-RS ID, a CSI-RS group ID, an antenna cluster ID, or a constant ID; $N_{ID1}$ is an ID selected for the terminal from first ID candidate values, where the first ID candidate values include: a combination of any two or any more than two of the cell ID, the RRH ID, the cell group ID, the RRH group ID, the terminal group ID, the CSI-RS ID, the CSI-RS group ID, the antenna cluster ID, and one or more than one constant ID; and $N_{ID2}$ is an ID selected for the terminal from second ID candidate values, where the second ID candidate values include: a combination of any two or any more than two of the cell ID, the RRH ID, the cell group ID, the RRH group ID, the terminal group ID, the CSI-RS ID, the CSI-RS group ID, the antenna cluster ID, and one or more than one constant ID. The first ID candidate values and the second ID candidate values may be the same or different; likewise, the selected $N_{ID1}$ and $N_{ID2}$ may also be the same or different.

Specifically, the base station may indicate $N_{ID1}$ and $N_{ID2}$ to the terminal through DMRS port signaling or dedicated ID selection indication signaling respectively, and may also indicate $N_{ID1}$ and $N_{ID2}$ to the terminal by carrying two ID indication identifier values in dedicated ID selection indication signaling. A specific implementation manner can be obtained with reference to the specific manner in the foregoing embodiment of the present invention, which is not described herein again.

Alternatively, in Formula 6, $N_{ID1}$ is an ID selected for the terminal from first ID candidate values, where the first ID candidate values are the same as the first ID candidate values described above; $N_{ID2}$ is an ID selected for the terminal from second ID candidate values, where the second ID candidate values are the same as the second ID candidate values described above; and $N_{ID3}$ is an ID selected by the base station for the terminal from third ID candidate values, where the third ID candidate values are the same as the third ID candidate values described above.

The terminal group related IDs are IDs generated by the network device according to indication information of a terminal set; the CSI-RS group related IDs are IDs generated by the network device according to CSI-RS configuration information; the antenna cluster related IDs are IDs generated according to antenna cluster serial numbers; the RRH group related IDs are IDs generated by the network device according to RRH serial numbers; and the terminal group related IDs are IDs generated by the network device according to indication information of a terminal set. For a further implementation manner, reference is made to Exemplary Embodiment 7 of the method.

Specifically, the base station may indicate any one of $N_{ID1}$, $N_{ID2}$, and $N_{ID3}$ through DMRS port signaling, and indicate the other two through two ID indication identifier values in dedicated ID selection indication signaling, and the base station may also indicate $N_{ID1}$, $N_{ID2}$, and $N_{ID3}$ through three ID indication identifier values in dedicated ID selection indication signaling. The base station may also indicate $N_{ID1}$, $N_{ID2}$, and $N_{ID3}$ through three pieces of signaling, namely, DMRS port signaling, first dedicated ID selection indication signaling, and second dedicated ID selection indication signaling. Setting of a DMRS port configuration table and various kinds of correspondence involved in specific implementation are not described herein again, and can be implemented with reference to the implementation manners described above.

The implementation manners of the present invention are all applicable to a scenario where the base station schedules multiple terminals over the same time-frequency resource. When the multiple terminals scheduled by the base station over the same resource include a terminal performing MU-MIMO, in step 101, the selecting, by the base station and from candidate IDs, an ID used for generating a reference signal initialization sequence for a terminal includes: preferentially selecting, by the base station for the terminal performing MU-MIMO, an ID used for generating a reference signal initialization sequence.

When the MU-MIMO terminal includes a CoMP terminal and a non-CoMP terminal, the base station preferentially selects, for the CoMP terminal, an ID used for generating a reference signal initialization sequence, and preferentially selects, for the non-CoMP terminal, an ID used for generating a reference signal initialization sequence the same as that selected for the CoMP terminal.

When the MU-MIMO terminal includes multiple CoMP terminals, the base station preferentially selects, for the multiple CoMP terminals, the same ID used for generating a reference signal initialization sequence.

Figure 3:
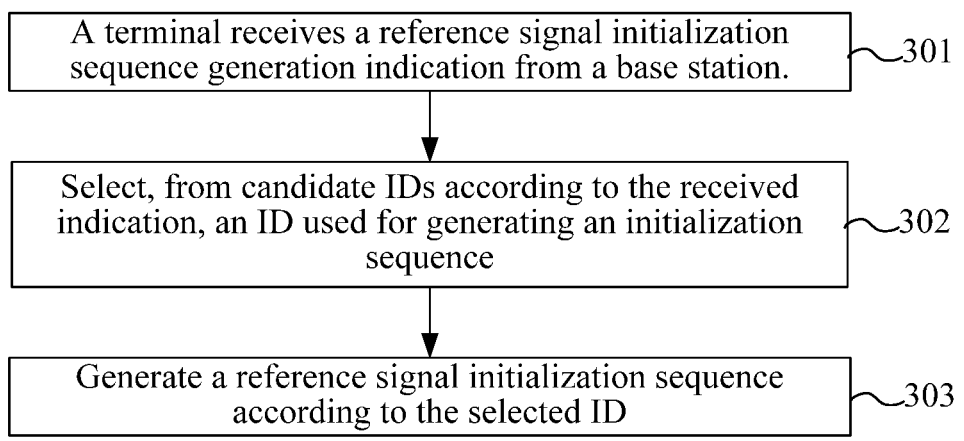
FIG. 3 is a flow chart of an embodiment of a reference signal sequence configuration method at a terminal side according to the present invention.

When the network device in FIG. 1 is a terminal, and when the terminal generates a reference signal initialization sequence, as shown in FIG. 3, the following steps are specifically included.

Step 301: The terminal receives a reference signal initialization sequence generation indication from a base station.

Step 302: Select, from candidate IDs according to the received indication, an ID used for generating an initialization sequence, where the candidate IDs include at least two IDs, and the selected ID does not include a scrambling ID.

Step 303: Generate a reference signal initialization sequence according to the selected ID.

Configuration the same as that of the base station is performed in the terminal. That is, the same candidate IDs, correspondence between scrambling codes and the candidate IDs, correspondence between ID indication identifier values and the candidate IDs, and DMRS port signaling table are configured, or a formula used for generating the candidate IDs are further configured. Definitely, corresponding to different implementation manners, because contents configured in the base station are different, specific contents configured in the terminal are also different.

In addition, after the terminal receives the reference signal initialization sequence generation indication sent by the base station, corresponding to a base station side, according to a scrambling code and/or an ID indication identifier value in the indication, as well as the DMRS port signaling table and configured correspondence between the scrambling codes and the candidate IDs in the terminal, and/or the correspondence between the ID indication identifier values and the candidate IDs in the terminal, the terminal determines an ID used for generating a reference signal initialization sequence and selected by the base station for the terminal. Because the ID is determined by adopting configuration and correspondence the same as those of the base station, the determined ID used for generating a reference signal initialization sequence is definitely the same as that of the base station, so that the base station and the terminal both can generate the same demodulation reference signal based on the reference signal initialization sequence.

Exemplary Embodiment 1

Figure 4:
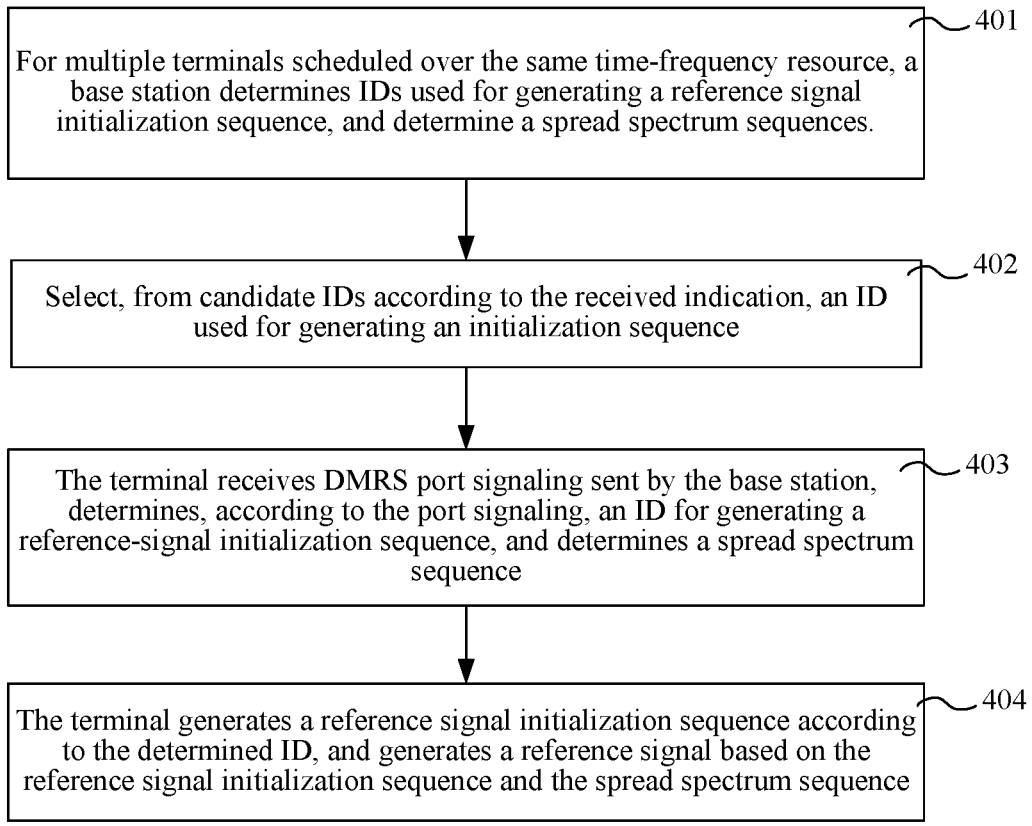
FIG. 4 is an overall flow chart of an exemplary embodiment of a reference signal sequence configuration method according to the present invention.

As shown in FIG. 4, it is a flow chart of Exemplary Embodiment 1 of the present invention. In this embodiment, a base station selects, for a terminal and from a first ID (Cell ID) and a second ID (Group ID), an ID for generating a reference signal initialization sequence, and indicates the ID to the terminal. The terminal selects, from the first ID and the second ID and according to the indication of the base station, an ID for generating a reference signal initialization sequence.

When the base station schedules multiple terminals over the same time-frequency resource, a procedure of this embodiment is triggered. The procedure of this embodiment specifically includes:

Step 401: For the multiple terminals scheduled over the same time-frequency resource, the base station determines IDs used for generating a reference signal initialization sequence, and determines spread spectrum sequences.

Formula 1 shows a manner of generating a reference signal initialization sequence provided in this embodiment. It can be seen that, in this embodiment, the base station may select one ID from the first ID and the second ID to generate a reference signal initialization sequence.

$$c_{init} = (\lfloor n_s/2 \rfloor + 1) \cdot (2N_{ID} + 1) \cdot 2^{16} + n_{SCID} \quad \text{Formula 7}$$

$$\begin{cases} n_{SCID} = 0, & N_{ID} = N_{ID}^{Cell} \\ n_{SCID} = 1, & N_{ID} = N_{ID}^{Group} \end{cases}$$

$n_{SCID}$ is used by the base station for indicating which ID the terminal should select to generate a reference signal initialization sequence, that is, what the value of $N_{ID}$ is, and physical quantities represented by the remaining parameters are the same as those in the prior art. (In specific implementation, the parameters may also be set as $$n_{SCID} = 1, \quad N_{ID} = N_{ID}^{Cell}$$
$$n_{SCID} = 0, \quad N_{ID} = N_{ID}^{Group},$$

which is an equivalent replacement of this implementation manner, and parameters used for indicating ID selection involved in the following implementation manners are all similar, and may be equivalently replaced through replacement of the indication manner.)

The Cell ID is a cell ID of a cell where the terminal is located, and a remote radio head (RRH) ID (in a scenario where an RRH ID exists), or a CSI-RS ID. The Group ID may be a cell group ID, a terminal group ID, a CSI-RS group ID, or an RRH group ID.

The CSI-RS ID is an ID generated according to channel state information reference symbol (CSI-RS) configuration information. The CSI-RS configuration information is a piece of CSI-RS configuration information that is notified by the base station to the terminal. Correspondence (for example, $N_{ID}^{Cell} = F(N_{CSI-RS}^1, C_{CSI-RS}^1, I_{CSI-RS}^1)$) is established between the number ($N_{CSI-RS}^1$) of antenna ports of a non-zero power CSI-RS and/or reference signal pattern configuration ($C_{CSI-RS}^1$) and/or subframe configuration ($I_{CSI-RS}^1$) in CSI-RS parameters and a CSI-RS ID, so that the base station and the terminal can determine a CSI-RS ID according to the number of antenna ports of one non-zero power CSI-RS and/or reference signal pattern configuration and/or subframe configuration.

Cell groups may be obtained through static division according to regions. For example, M cells in a certain large geographical area are divided into N cell groups, each cell group includes multiple cells, and the N cell groups may overlap or may not overlap. Alternatively, in a situation where a macro cell and a micro cell exist, a macro cell and a micro cell within a coverage range of the macro cell are grouped into one group.

Cell groups may also be obtained through dynamic division with respect to terminals. For example, in a situation where a CoMP terminal exists, the base station groups multiple cells participating in CoMP coordination for the terminal into one group.

The ID of a cell group may be the same as the ID of a cell in the cell group. For example, when determining the cell group ID, the base station may determine the cell group ID as a cell ID of any one cell other than the current cell, that is, a cell ID that is different from the Cell ID determined by the base station and among cell IDs. The base station may also determine an ID of a serving cell (the Serving Cell is a cell that sends scheduling signaling) of a CoMP terminal as the cell group ID. In a situation where multiple CoMP terminals exist, the base station may use an ID of a serving cell of any one CoMP terminal scheduled over the same time-frequency resource as a cell group ID of the multiple CoMP terminals. In a situation where a macro cell and a micro cell in a coverage range of the macro cell are grouped into one group, the base station may also determine an ID of the macro cell as the cell group ID.

The ID of the cell group may also be different from any cell ID in the cell group, but may be the same as a cell ID in other cell groups. For example, the cell group is statically configured with a cell ID of any one of the other cell groups.

The ID of the cell group may also be different from any cell ID in the cell group. For example, a value of a cell ID is in a range from 0 to N, and a value of a cell group ID may be from N+1 to M, where M is a positive integer greater than N+1.

In a situation where a CoMP terminal exists in a scenario of MU-MIMO, the base station preferentially adopts any one of the last two manners to configure a cell group ID.

In a static manner, a cell group ID of a cell involved in a coverage range of the base station is saved in the base station. When the terminal accesses the base station from a cell in a certain cell group, the base station determines a corresponding cell group ID and saves the cell group ID for the terminal (in a situation where only one cell is included in the coverage range of the base station, the two steps, that is, the determination and saving steps, may be omitted), and sends the cell group ID to the terminal. The terminal saves the cell group ID as a Group ID.

A terminal group is obtained when a base station maps already accessed terminals in a cell to multiple groups, which may be static mapping herein. For example, the base station groups terminals scheduled over certain time-frequency resources into one group, assigns a terminal group ID to the group, and sends the assigned terminal group ID to the terminals, for example, UE specific high-layer signaling, and the terminals save the terminal group ID as a Group ID.

A CSI-RS group is obtained when a base station groups terminals having the same channel state information reference symbol (CSI-RS) configuration information into one group. The CSI-RS configuration information may be one piece of CSI-RS configuration information or one of multiple pieces of CSI-RS configuration information notified by the base station to a terminal. Correspondence (for example, $N_{ID}^{Group} = F(N_{CSI-RS}^1, C_{CSI-RS}^1, I_{CSI-RS}^1)$, where the function herein may be the same as or different from the function for generating a CSI-RS ID) is established between the number ($N_{CSI-RS}^1$) of antenna ports of a non-zero power CSI-RS and/or reference signal pattern configuration ($C_{CSI-RS}^1$) and/ or subframe configuration ($I_{CSI-RS}^1$) in CSI-RS parameters and a CSI-RS group ID, so that the base station and the terminal can determine a CSI-RS group ID according to the number of antenna ports of one non-zero power CSI-RS and/or reference signal pattern configuration and/or subframe configuration. The CSI-RS configuration information may also be multiple pieces of CSI-RS configuration information among the multiple pieces of CSI-RS configuration information that are notified by the base station to the terminal. Taking two pieces of CSI-RS configuration information as an example, correspondence (for example, $N_{ID}^{Group}=F(N_{CSI-RS}^1, C_{CSI-RS}^1, I_{CSI-RS}^1, N_{CSI-RS}^2, C_{CSI-RS}^2, I_{CSI-RS}^2, \ldots)$) may be established between the numbers ($N_{CSI-RS}^1, N_{CSI-RS}^2$) of antenna ports of non-zero power CSI-RSs and/or reference signal pattern configuration ($N_{CSI-RS}^1, C_{CSI-RS}^1$) and/or subframe configuration ($I_{CSI-RS}^1, I_{CSI-RS}^1$) in CSI-RS parameters and a CSI-RS group ID, so that the base station and the terminal can determine a CSI-RS group ID according to the numbers of antenna ports of multiple non-zero power CSI-RSs and/or reference signal pattern configuration and/or subframe configuration. After determining a CSI-RS group ID in the above manner, the base station and the terminal each save the CSI-RS group ID as a Group ID corresponding to the terminal.

An RRH group is obtained when multiple RRHs in a cell of a base station are divided into multiple groups, where RRHs having the same configuration are grouped into one group, and the base station assigns an RRH group ID to each group of RRHs. When a terminal accesses the base station through an RRH, the base station determines a corresponding RRH group ID, saves the RRH group ID for the terminal, and sends the RRH group ID to the terminal, and the terminal saves the RRH group ID as a Group ID.

When for terminals, IDs used for generating a reference signal initialization sequence are determined and spread spectrum sequences are determined, the same ID and different spread spectrum sequences are preferred, and different IDs are less preferred. A specific manner is as follows:

If the base station schedules multiple terminals over the same time-frequency resource, the total number of layers of the multiple terminals is x, and multiple terminal pairing is not performed between the terminals. First, a relationship between the total number x of layers of these terminals and the number y of selectable orthogonal spread spectrum sequences of the base station is determined. If x is less than or equal to y, one ID is selected, the ID is assigned to these terminals, and different spread spectrum sequences orthogonal to each other are assigned to the layers of these terminals. If x is greater than y, these terminals are divided into groups according to degrees of interference, and the total number of layers of terminals in each group is less than or equal to y. For example, the terminals are divided into a first group of terminals (x1, x2, and x3) and a second group of terminals (x4, x5, and x6), and a total of N terminal groups are obtained by analogy. The grouping principle may also be grouping according to CSI-RS configuration, so that all terminals in a group are assigned with the same ID, layers of ports adopt different spread spectrum sequences orthogonal to each other, and different groups adopt different IDs. When the number of configurable IDs is M and N>M, terminal groups having small interference with each other may adopt the same ID, and groups having great interference with each other adopt different IDs as much as possible.

If multiple terminal paring (MU-MIMO) is performed by terminals among the multiple terminals scheduled by the base station over the same time-frequency resource, the total number z of layers (layer) of paired terminals is determined (for example, when two terminals adopting two layers of ports are paired, the total number of layers is 4). If z is less than or equal to the length m of a spread spectrum sequence of the base station, reference signal ports corresponding to each layer adopt the same ID and adopt spread spectrum sequences orthogonal to each other. Herein, if the paired terminals include a CoMP terminal, the adopted ID is determined according to the CoMP terminal; otherwise, reference signal ports corresponding to paired layers are divided into N groups, the same ID is adopted in each group, and orthogonal spread spectrum sequences are adopted. An assignment principle for the group is the same as that described above, different IDs are used for the groups, and the IDs may be scrambling IDs.

For example, terminal 1 and terminal 2 that perform MU-MIMO adopt two layers of ports. In a situation of Table 1 or Table 2, the total number of spread spectrum sequences is 2, so that the total number of layers 4 is greater than the total number of the spread spectrum sequences 2. A Cell ID and a Group ID are selected for terminal 1 and terminal 2 respectively, and ports of the layers are configured into port 7 and port 8, that is, port 7 [1, 1] and port 8 [1, −1] are selected as spread spectrum sequences.

In a situation of Table 3 below, the total number of spread spectrum sequences is 4, and the total number of layers 4 is equal to the total number of spread spectrum sequences 4, so that the same ID may be selected for terminal 1 and terminal 2. If terminal 1 herein is a CoMP terminal and terminal 2 is a non-CoMP terminal, the selected ID is determined according to terminal 1, for example, if a Group ID is selected, and the Group ID is also selected for terminal 2. Orthogonal spread spectrum sequences are selected for terminal 1 and terminal 2, for example, port 7 [1, 1, 1, 1], port 8 [1, −1, 1, −1], port 11 [1, 1, −1, −1], and port 13 [1,−1,−1,1] are selected.

Step 402: According to an ID and a spread spectrum sequence selected for each terminal, the base station sends a reference signal initialization sequence generation indication to the terminal.

Specifically, the base station sends the reference signal initialization sequence generation indication to the terminal through signaling that indicates a DMRS port and is in downlink scheduling signaling.

The base station may determine, based on a preconfigured port configuration table, which DMRS port signaling is to be adopted to deliver the reference signal initialization sequence generation indication to the terminal. The port configuration table may be in the form of Table 1, Table 2, or Table 3 below.

TABLE 1

| One codeword: Codeword 0 enabled. Codeword 1 disabled. | Two codeword: Codeword 0 enabled. Codeword 1 enabled. |
|---|---|
| Message | Message |
| 0  1 layer, port 7, SCID = 0 | 0  2 layers, port 7-8, SCID = 0 |
| 1  1 layer, port 7, SCID = 1 | 1  2 layers, port 7-8, SCID = 1 |
| 2  1 layer, port 8, SCID = 0 | 2  3 layers, port 7-9, SCID = 0 |
| 3  1 layer, port 8, SCID = 1 | 3  4 layers, port 7-10, SCID = 0 |
| 4  2 layer, port 7-8, SCID = 0 | 4  5 layers, port 7-11, SCID = 0 |
| 5  3 layer, port 7-9, SCID = 0 | 5  6 layers, port 7-12, SCID = 0 |
| 6  4 layer, port 7-10, SCID = 0 | 6  7 layers, port 7-13, SCID = 0 |
| 7  reserved | 7  8 layers, port 7-14, SCID = 0 |

TABLE 2

| One codeword: Codeword 0 enabled. Codeword 1 disabled. | Two codeword: Codeword 0 enabled. Codeword 1 enabled. |
|---|---|
| Message | Message |
| 0  1 layer, port 7, SCID = 0 | 0  2 layers, port 7-8, SCID = 0 |
| 1  1 layer, port 7, SCID = 1 | 1  2 layers, port 7-8, SCID = 1 |
| 2  1 layer, port 8, SCID = 0 | 2  3 layers, port 7-9, SCID = 0 |
| 3  1 layer, port 8, SCID = 1 | 3  3 layers, port 7-9, SCID = 1 |
| 4  2 layer, port 7-8, SCID = 0 | 4  4 layers, port 7-10, SCID = 0 |
| 5  2 layer, port 7-8, SCID = 1 | 5  4 layers, port 7-10, SCID = 1 |
| 6  3 layer, port 7-9, SCID = 0 | 6  5 layers, port 7-11, SCID = 0 |
| 7  3 layer, port 7-9, SCID = 1 | 7  5 layers, port 7-11, SCID = 1 |
| 8  4 layer, port 7-10, SCID = 0 | 8  6 layers, port 7-12, SCID = 0 |
| 9  4 layer, port 7-10, SCID = 1 reserved | 9  6 layers, port 7-12, SCID = 1 |
|  | 10  7 layers, port 7-13, SCID = 0 |
|  | 11  7 layers, port 7-13, SCID = 1 |
|  | 12  8 layers, port 7-14, SCID = 0 |
|  | 13  8 layers, port 7-14, SCID = 1 |

Based on Table 1 or Table 2, in the example provided in the previous step that terminal 1 and terminal 2 perform MU-MIMO, in this step, the base station instruct, through 0 and 1 in two-codeword signaling, terminal 1 and terminal 2 to generate a reference signal initialization sequence.

The base station may also determine, based on Table 3 below, which DMRS port signaling is to be adopted to deliver the reference signal initialization sequence generation indication to the terminal.

TABLE 3

| One Codeword: Codeword 0 enabled, Codeword 1 disabled |
|---|
| Message |
| 0   1 layer, port 7, SCID = 0, OCC = 4 |
| 1   1 layer, port 7, SCID = 1, OCC = 4 |
| 2   1 layer, port 8, SCID = 0, OCC = 4 |
| 3   1 layer, port 8, SCID = 1, OCC = 4 |
| 4   1 layer, port 11, SCID = 0, OCC = 4 |
| 5   1 layer, port 11, SCID = 1, OCC = 4 |
| 6   1 layer, port 13, SCID = 0, OCC = 4 |
| 7   1 layer, port 13, SCID = 1, OCC = 4 |

Based on Table 3, in the example provided in the previous step that CoMP terminal 1 and non-CoMP terminal 2 perform MU-MIMO, in this step, the base station instruct, through 1 and 3 in one-codeword signaling, terminal 1 and terminal 2 to generate a reference signal initialization sequence.

In this step, specific spread spectrum sequences corresponding to ports in the tables may be determined with reference to a standard protocol about LTE, which are not listed herein one by one.

Step 403: After receiving DMRS port signaling sent by the base station, the terminal determines, according to the port signaling, a spread spectrum sequence and an ID for generating a reference signal initialization sequence.

The terminal preconfigures a port configuration table the same as that of the base station side. Based on the port configuration table and the received DMRS port signaling, the terminal determines the ID used for generating the reference signal initialization sequence, and determines the spread spectrum sequence.

When determining the ID used for generating the reference signal initialization sequence, the terminal first determines a scrambling ID value according to the DMRS port signaling, and then determines a corresponding ID according to the scrambling ID value and correspondence between scrambling ID values and IDs. In this embodiment, the correspondence between scrambling ID values and IDs is described in a manner of parameters in a formula, and in specific implementation, various configuration manners of correspondence may be, for example, a list.

Step 404: The terminal generates a reference signal initialization sequence according to the determined ID, and generates a demodulation reference signal based on the reference signal initialization sequence and the spread spectrum sequence.

In this embodiment, the base station may also generate a reference signal initialization sequence according to the ID selected for the terminal, and further generate a demodulation reference signal based on the reference signal initialization sequence and the spread spectrum sequence. In this step, the terminal also adopts an algorithm the same as that of the base station, and generates the reference signal initialization sequence and the demodulation reference signal according to the ID indicated by the base station through the DMRS port signaling.

When generating the demodulation reference signal, the terminal and the base station may generate a DMRS sequence of a corresponding length according to a maximum system bandwidth, as shown in Formula 8:

$$r(m) = \frac{1}{\sqrt{2}}(1 - 2 \cdot c(2m)) + j\frac{1}{\sqrt{2}}(1 - 2 \cdot c(2m+1))$$ Formula 8

In Formula 8, m is determined through Formula 9:

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$ Formula 9

Physical quantities represented by parameters in Formula 8 and Formula 9 are the same that those in the prior art.

In Formula 9, $N_{RB}^{max,DL}$ is the number of resource blocks included in the maximum system bandwidth among all system bandwidths, and for LTE and LTE-A, the maximum system bandwidth is 20 M, and the number of effective resource blocks included in the maximum system bandwidth is 100. $N_{RB}^{1,DL}$, $N_{RB}^{2,DL}$, and $N_{RB}^{3,DL}$, are the numbers of effective resource blocks included in system bandwidths other than the maximum system bandwidth, where $N_{RB}^{1,DL} > N_{RB}^{2,DL} > N_{RB}^{3,DL}$. For the LTE and the LTE-A, $N_{RB}^{1,DL}$, is the number of effective resource blocks corresponding to a 10 M system bandwidth and is 50, $N_{RB}^{2,DL}$, is the number of effective resource blocks corresponding to a 5 M system bandwidth and is 25, and $N_{RB}^{3,DL}$, is the number of effective resource blocks corresponding to a 1.4 M system bandwidth and is 6. For different system bandwidths, DMRS sequences of corresponding lengths are cut off from a longest sequence, and the cutting process is shown in FIG. 4, that is, a reference signal sequence in each system bandwidth is a sequence of a corresponding length cut off from a longest sequence with central subcarriers aligned to each other.

In this embodiment, because the base station may adopt two IDs, namely, the Group ID and the Cell ID, to generate reference signal initialization sequences for terminals using the same time-frequency resource, a demodulation reference signal sequence configuring method different from the prior art is provided.

In addition, in the existing LTE-A, if the terminal is a coordinated multi-point (CoMP) terminal, the terminal may receive downlink data sent from multiple cells, and the multiple cells need to configure the same demodulation reference signal sequence for the terminal according to a joint transmission ID, so that the terminal can correctly perform receiving and demodulation. If the terminal is a non-CoMP terminal, DMRS configuration is performed only according to a cell ID of the current cell. When the CoMP terminal and the non-CoMP terminal perform multiple user multiple-input multiple-output (MU-MIMO) signal transmission, if a DMRS sequence adopted by CoMP terminal 1 is configured according to the joint transmission ID, a DMRS terminal adopted by Non-CoMP terminal 2 is configured according to the ID of the current cell, and the two DMRS sequences are different, terminal 1 and terminal 2 cannot perform orthogonal pairing, and the performance of the terminals are influenced.

In the solution of this embodiment, according to the ID adopted by the CoMP terminal, the base station may select, from the Group ID and the Cell ID and for the non-CoMP terminal performing MU-MIMO with the CoMP terminal, an ID used for generating a reference signal initialization sequence, so that the CoMP terminal and the non-CoMP terminal can successfully perform orthogonal pairing, thereby improving the performance of the terminals.

Moreover, in a scenario where an RRH does not have an ID, RRHs are divided into groups in this embodiment, and when terminals that get access through RRHs in different groups uses the same time-frequency resource, the terminals may adopt different Group IDs, or may adopt the Group ID and the Cell ID respectively to avoid interference, so that the capacity of the base station is expanded in the scenario where an RRH does not have an ID.

Exemplary Embodiment 2

In this embodiment, dedicated ID selection indication signaling is used, so as to instruct a terminal to determine an ID used for generating a reference signal initialization sequence, and a scrambling ID is not used for instruction, so that the terminal may adopt the same ID and different scrambling IDs to generate a reference signal initialization sequence.

Except the following differences, the remaining technical implementation solutions of this embodiment and Embodiment 1 are the same.

(1) In this embodiment, in step 401, in addition to an ID used for generating a reference signal initialization sequence and a spread spectrum sequence, parameters used for generating a demodulation reference signal and determined by the base station for the terminal further include a scrambling ID used for generating a reference signal initialization sequence. Correspondingly, when the base station determines a demodulation reference signal generating manner for x terminals scheduled over the same time-frequency resource, the number of layers of terminals which adopt the same ID is doubled, compared with the previous embodiment, by adopting different scrambling IDs. Meanwhile, compared with a manner of determining a reference signal initialization sequence by adopting a cell ID in the prior art, the number of layers of terminals that can be scheduled by the base station over the same time-frequency resource is also doubled.

In specific selection, preferably, layers of ports of the terminals adopt the same ID, the same scrambling ID, and orthogonal spread spectrum sequences; less preferably, adopt the same ID, orthogonal spread spectrum sequences, and another scrambling ID, or another ID, the same spread spectrum sequence, and the same scrambling ID or different scrambling IDs; and the least preferably, adopt another ID, other selectable spread spectrum sequences, and the same scrambling ID or different scrambling IDs. A further selection manner, for example, a selection manner in a scenario where terminals perform MU-MIMO and a CoMP terminal is involved, can be implemented with reference to Embodiment 1.

For example, for the scenario in the previous embodiment where CoMP terminal 1 and non-CoMP terminal 2 perform MU-MIMO and the port signaling table is Table 3, the ID used for generating the reference signal initialization sequence and determined by the base station for terminal 1 and terminal 2 is the Group ID, the spread spectrum sequences are port 7 [1, 1, 1, 1] and port 8 [1, −1, 1, −1] (which may also be other orthogonal spread spectrum sequences), and the scrambling ID is 0 (which may definitely also be 1).

(2) A different formula for generating an initialization sequence and a different manner of indicating an initialization sequence are adopted.

An initialization sequence formula is:

$$c_{init} = (\lfloor n_s/2 \rfloor + 1) \cdot (2N_{ID} + 1) \cdot 2^{16} + n_{SCID} \quad \text{Formula 10}$$

$$\begin{cases} Y = 0, N_{ID} = N_{ID}^{Cell}, n_{SCID} = 0 \\ Y = 0, N_{ID} = N_{ID}^{Cell}, n_{SCID} = 1 \\ Y = 1, N_{ID} = N_{ID}^{Group}, n_{SCID} = 0 \\ Y = 1, N_{ID} = N_{ID}^{Group}, n_{SCID} = 1 \end{cases}$$

In the formula, Y is a parameter indicating which ID is to be selected. In the formula, when Y=0, it indicates that a Cell ID is selected, and when Y=1, it indicates that a Group ID is selected. A value of Y is sent to the terminal by the base station through dedicated ID selection indication signaling. The dedicated ID selection indication signaling may be dynamic signaling, for example, an NDI of a TB is used for indication.

In this embodiment, a manner of generating a demodulation reference signal is jointly indicated through DMRS port signaling (that is, the DMRS port signaling is used for indicating a scrambling ID and a spread spectrum sequence, and specific implementation can be obtained with reference to the previous embodiment) and dedicated ID selection indication signaling.

After receiving the DMRS port signaling and the dedicated ID selection indication signaling, the terminal determines the value of Y according to the dedicated ID selection indication signaling, and then determines the ID used for generating the reference signal initialization sequence, and determines, according to the DMRS port signaling, a spread spectrum sequence used for generating a demodulation reference signal, and a scrambling ID. Afterwards, according to the ID, the spread spectrum sequence, and the scrambling ID, the terminal generates a demodulation reference signal according to a formula the same as that of the base station. For example, when the base station indicates that Y=0, when DMRS port signaling indicated in a One codeword mode shown in Table 1 in the port signaling table is 0, according to the value of Y and correspondence between Y and IDs that is configured in the terminal, the terminal determines that the cell ID is adopted and port 7 [1, 1] is adopted as the spread spectrum sequence, where $n_{SCID}=0$.

In this embodiment, based on all the effects of Embodiment 1, the dedicated ID selection indication signaling is adopted to indicate the ID used for generating the reference signal initialization sequence to the terminal, so that the scrambling ID adopted by the terminal may be indicated through the DMRS port signaling, that is, the base station may indicate different scrambling IDs to terminals adopting the same ID and the same spread spectrum sequence. Compared with both the prior art and Embodiment 1, the number of layers of terminals scheduled by the base station over the same time-frequency resource is increased.

Exemplary Embodiment 3

The difference between this embodiment and Embodiment 1 only lies in that a different formula for generating an initialization sequence is adopted (a parameter correspondence table, that is, correspondence between scrambling IDs and IDs used for generating a reference signal initialization sequence, is also different from that in Embodiment 1). In this embodiment, a formula for generating an initialization sequence is:

$$c_{init} = (\lfloor n_s/2 \rfloor + 1) \cdot (2N_{ID1} + 1) \cdot 2^{16} + XN_{ID2} + n_{SCID} \quad \text{Formula 11}$$

$$\begin{cases} n_{SCID} = 0, & N_{ID1} = N_{ID}^{Cell}, N_{ID2} = 0 \\ n_{SCID} = 1, & N_{ID1} = 0, N_{ID2} = N_{ID}^{Group} \end{cases}$$

or, $$c_{init} = (\lfloor n_s/2 \rfloor + 1) \cdot (2N_{ID1} + 1) \cdot 2^{16} + XN_{ID2} + n_{SCID} \quad \text{Formula 12}$$

$$\begin{cases} n_{SCID} = 0, & N_{ID1} = N_{ID}^{Group}, N_{ID2} = 0 \\ n_{SCID} = 1, & N_{ID1} = 0, N_{ID2} = N_{ID}^{Cell} \end{cases}$$

In the formula, X is a positive integer greater than or equal to 1. For example, the value of X may be:

$$2 \le X \le \frac{2^{16}}{\max(\Phi(N_{ID2}))},$$

where $\Phi(N_{ID2})$ is a set of candidate IDs, $\max(d(N_{ID2}))$ is a maximum ID in the set of candidate IDs, and $X=2^M$.

The remaining involved overall implementation steps of the embodiment and specific implementation manners of the steps are all the same as those in Embodiment 1, which are not described herein again.

Exemplary Embodiment 4

This embodiment is basically the same as Embodiment 2, and the difference only lies in that a different formula for generating a reference signal initialization sequence is adopted (a parameter correspondence table, that is, correspondence between Y and IDs used for generating a reference signal initialization sequence, is also different from that in Embodiment 2). In this embodiment, the formula for generating a reference signal initialization sequence is:

$$c_{init} = (\lfloor n_s/2 \rfloor + 1) \cdot (2N_{ID} + 1) \cdot 2^{16} + XN_{ID2} + n_{SCID} \quad \text{Formula 13}$$

$$\begin{cases} Y = 0, & n_{SCID} = 0, & N_{ID1} = N_{ID}^{Cell}, N_{ID2} = 0 \\ Y = 1, & n_{SCID} = 1, & N_{ID1} = 0, N_{ID2} = N_{ID}^{Group} \\ Y = 0 & n_{SCID} = 0, & N_{ID1} = N_{ID}^{Cell}, N_{ID2} = 0 \\ Y = 1 & n_{SCID} = 1, & N_{ID1} = 0, N_{ID2} = N_{ID}^{Group} \end{cases}$$

or, $$c_{init} = (\lfloor n_s/2 \rfloor + 1) \cdot (2N_{ID} + 1) \cdot 2^{16} + XN_{ID2} + n_{SCID} \quad \text{Formula 14}$$

$$\begin{cases} Y = 0, & n_{SCID} = 0, & N_{ID1} = N_{ID}^{Group}, N_{ID2} = 0 \\ Y = 1, & n_{SCID} = 1, & N_{ID1} = 0, N_{ID2} = N_{ID}^{Cell} \\ Y = 0 & n_{SCID} = 0, & N_{ID1} = N_{ID}^{Group}, N_{ID2} = 0 \\ Y = 1 & n_{SCID} = 1, & N_{ID1} = 0, N_{ID2} = N_{ID}^{Cell} \end{cases}$$

In Formula 13 and Formula 14, a manner of assigning a value to X is the same as that in Embodiment 3, and meanings of the remaining physical parameters are the same as those in Embodiment 2.

The remaining involved overall implementation steps of the embodiment and specific implementation manners of the steps are all the same as those in Embodiment 2, which are not described herein again.

Exemplary Embodiment 5

Except the following differences, the remaining technical implementation solutions of this embodiment and Embodiment 1 are the same.

(1) A different formula for generating a reference signal initialization sequence is adopted (a parameter correspondence table, that is, correspondence between scrambling IDs and IDs used for generating a reference signal initialization sequence, is also different from that in Embodiment 1). In this embodiment, the formula for generating a reference signal initialization sequence is:

$$c_{init} = (\lfloor n_s/2 \rfloor + 1) \cdot (2N_{ID} + 1) \cdot 2^{16} + XN_{ID2} + n_{SCID} \quad \text{Formula 15}$$

$$\begin{cases} n_{SCID} = 0, & N_{ID1} = N_{ID}^{Group}, N_{ID2} = N_{ID}^{Cell} \\ n_{SCID} = 1, & N_{ID1} = N_{ID}^{Group}, N_{ID2} = 0 \end{cases}$$

or, $$c_{init} = (\lfloor n_s/2 \rfloor + 1) \cdot (2N_{ID1} + 1) \cdot 2^{16} + XN_{ID2} + n_{SCID} \quad \text{Formula 16}$$

$$\begin{cases} n_{SCID} = 0, & N_{ID1} = N_{ID}^{Cell}, N_{ID2} = N_{ID}^{Group} \\ n_{SCID} = 1, & N_{ID1} = N_{ID}^{Cell}, N_{ID2} = 0 \end{cases}$$

(2) In Embodiment 1, when the base station determines, for x terminals scheduled at the same time-frequency, a manner of generating a reference signal initialization sequence, a situation where a Cell ID (Formula 11 is adopted) or a situation where a Group ID (Formula 12 is adopted) is selected is replaced with a situation where a Group ID and a Cell ID are selected.

The remaining involved overall implementation steps of the embodiment and specific implementation manners of the steps are all the same as those in Embodiment 1, which are not described herein again.

Exemplary Embodiment 6

Except the following differences, the remaining technical implementation solutions of this embodiment and Embodiment 2 are the same.

(1) A different formula for generating a reference signal initialization sequence is adopted (a parameter correspondence table, that is, correspondence between values of Y and IDs used for generating a reference signal initialization sequence, is also different from that in Embodiment 2). In this embodiment, the formula for generating a reference signal initialization sequence is:

$$c_{init} = (\lfloor n_s/2 \rfloor + 1) \cdot (2N_{ID} + 1) \cdot 2^{16} + XN_{ID2} + n_{SCID} \quad \text{Formula 17}$$

$$\begin{cases} Y=0, & n_{SCID}=0 \quad N_{ID1}=N_{ID}^{Group}, N_{ID2}=N_{ID}^{Cell} \\ Y=0 & n_{SCID}=1 \quad N_{ID1}=N_{ID}^{Group}, N_{ID2}=N_{ID}^{Cell} \\ Y=1, & n_{SCID}=0, \quad N_{ID1}=N_{ID}^{Group}, N_{ID2}=0 \\ Y=1, & n_{SCID}=1, \quad N_{ID1}=0, N_{ID}^{Group}, N_{ID2}=0 \end{cases}$$

or, $$c_{init} = (\lfloor n_s/2 \rfloor + 1) \cdot (2N_{ID} + 1) \cdot 2^{16} + XN_{ID2} + n_{SCID} \quad \text{Formula 18}$$

$$\begin{cases} Y=0, & n_{SCID}=0 \quad N_{ID1}=N_{ID}^{Cell}, N_{ID2}=N_{ID}^{Group} \\ Y=0 & n_{SCID}=1 \quad N_{ID1}=N_{ID}^{Cell}, N_{ID2}=N_{ID}^{Group} \\ Y=1, & n_{SCID}=0, \quad N_{ID1}=N_{ID}^{Cell}, N_{ID2}=0 \\ Y=1, & n_{SCID}=1, \quad N_{ID1}=0, N_{ID}^{Cell}, N_{ID2}=0 \end{cases}$$

A manner of assigning a value to X is the same as that in Embodiment 3, and meanings of the remaining physical parameters are the same as those in Embodiment 2.

(2) In Embodiment 2, when the base station determines a manner of generating a reference signal initialization sequence for x terminals scheduled at the same time-frequency, a situation where a Cell ID (Formula 13 is adopted) or a situation where a Group ID (Formula 14 is adopted) is selected is replaced with a situation where a Cell ID and a Group ID are selected.

The remaining involved overall implementation steps of the embodiment and specific implementation manners of the steps are all the same as those in Embodiment 2, which are not described herein again.

Exemplary Embodiment 7

In this embodiment, a formula for generating a reference signal initialization sequence and a manner of sending parameters involved in the formula are different from those in the foregoing embodiment:

$$c_{init} = (\lfloor n_s/2 \rfloor + 1) \cdot (2N_{ID1} + 1) \cdot 2^{16} + ZN_{ID3} + n_{SCID} \quad \text{Formula 19}$$

In the formula, $N_{ID1}$ may be fixedly configured into the Cell ID or the Group ID, and may also be selectively configured into the Cell ID or the Group ID, and a manner of selective configuration may be implemented in a manner of delivery through the port signaling in Embodiment 1 or delivery through the dedicated ID selection indication signaling in Embodiment 2; Z is a positive integer greater than or equal to 1, and a value of Z may be, for example, $$2 \leq Z \leq \frac{2^{16}}{\max(\Phi(N_{ID2}))},$$

where $\Phi(N_{ID2})$ is a set of candidate IDs, $\max(\Phi(N_{ID2}))$ is a maximum ID in the set of candidate IDs, and $Z=2^M$; and $N_{ID3}$ is a third ID.

In this embodiment, before the procedure shown in FIG. 3 is performed, the base station notifies one or more of candidate values of the third ID to the terminal. If the base station notifies one candidate value of the third ID to the terminal, the base station and the terminal use the candidate value of the third ID as the third ID. In this situation, a manner of selective configuration is adopted for $N_{ID1}$; otherwise, if the base station notifies multiple candidate values of the third ID to the terminal, a manner of selective configuration may be adopted for $N_{ID1}$, and a manner of fixed configuration may also be adopted.

The base station semi-statically notifies one or more of the candidate values of the third ID to the terminal through terminal specific high-layer signaling, for example, through dedicated signaling in radio resource control (RRC) signaling. The base station may assign different candidate values of the third ID to different terminals scheduled over the same time-frequency resource, and may also assign the same candidate value of the third ID to different terminals. The candidate values of the third ID herein are different from the Cell ID or the Group ID mentioned in the foregoing embodiment, and may also be the same as the Cell ID or the Group ID mentioned in the foregoing embodiment.

Alternatively

The base station may notify one or more of the candidate values of the third ID to the terminal in an implicit manner. The implicit manner refers to that a candidate value of the third ID is generated according to information known by both the base station and the terminal. The information known by both the base station and the terminal may be one or more of pieces of CSI-RS configuration information or one or more of RRH serial numbers or indication information of a user set. In this case, the base station does not need to notify the candidate value of the third ID to the terminal through additional signaling, and the terminal may learn the candidate value of the third ID by using the known information. Specifically, in an implementation manner, the candidate value of the third ID is generated according to one piece of CSI-RS configuration information, where the CSI-RS configuration information may be one piece of CSI-RS configuration information or one of multiple pieces of CSI-RS configuration information notified by the base station to the terminal. The base station and the terminal establish correspondence (for example, $N_{ID3}=F(N_{CSI-RS}^1, C_{CSI-RS}^1, I_{CSI-RS}^1)$); herein, when one CSI-RS group related ID needs to be determined, a specific function adopted may be the same as the function for generating a CSI-RS ID or a CSI-RS group ID in Exemplary Embodiment 1, and when more than one CSI-RS group related ID needs to be generated, a specific function is different from the function in Embodiment 1) between the number ($N_{CSI-RS}^1$) of antenna ports of a non-zero power CSI-RS and/or reference signal pattern configuration ($C_{CSI-RS}^1$) and/or subframe configuration ($I_{CSI-RS}^1$) in CSI-RS parameters and a third ID candidate value, so that the base station and the terminal can determine one or more than one CSI-RS group related ID as a third ID candidate value according to the number of antenna ports of one non-zero power CSI-RS and/or reference signal pattern configuration and/or subframe configuration. In another implementation manner, the candidate value of the third ID is generated according to multiple pieces of CSI-RS configuration information, where the multiple pieces of CSI-RS configuration information may be among the multiple pieces of CSI-RS configuration information notified by the base station to the terminal. The base station and the terminal establish correspondence (for example, $N_{ID3}=F(N_{CSI-RS}^1, C_{CSI-RS}^1, I_{CSI-RS}^1, N_{CSI-RS}^2, C_{CSI-RS}^2, I_{CSI-RS}^2, \ldots)$) between the numbers ($N_{CSI-RS}^1, N_{CSI-RS}^2$) of antenna ports of non-zero power CSI-RSs and/or reference signal pattern configuration ($C_{CSI-RS}^1, C_{CSI-RS}^2$) and/or subframe configuration ($I_{CSI-RS}^1, I_{CSI-RS}^2$) in CSI-RS parameters and a third ID candidate value, so that the base station and the terminal can determine one or more than one CSI-RS group related ID as the third ID candidate value according to the numbers of antenna ports of multiple non-zero power CSI-RSs and/or reference signal pattern configuration and/or subframe configuration. Likewise, the third ID candidate value may also be obtained when correspondence between one or more of antenna cluster serial numbers, or one or more of RRH serial numbers, or an indication of a user set, and an antenna cluster related ID, an RRH related ID, or a terminal group related ID used as the third ID candidate value is established through a specific function according to the one or more antenna cluster serial numbers, or the one or more RRH serial numbers, or a user group ID, so that the base station and the terminal can determine the third ID candidate value according to the one or more antenna cluster serial numbers, or the one or more RRH serial numbers, or the indication of a user set.

Alternatively

One or more of the candidate values of the third ID are fixed to one or more of constants and are set in the terminal and the base station.

It should be noted that all or a part of the methods for the base station to notify multiple candidate values of the third ID to the terminal may be simultaneously used for notifying the multiple candidate values of the third ID to the terminal. In this case, the base station needs to notify, through additional third ID value assigning method signaling, which may be UE specific high-layer signaling, for example, dedicated signaling in RRC signaling, the terminal of which method is adopted for each candidate value of the third ID, or the terminal of which one or more of candidate values of the third ID each method is adopted for, and correspondence between parameter values in the signaling and third ID value assigning methods needs to be configured in both the base station and the terminal.

If the base station notifies multiple candidate values of the third ID to the terminal, the base station needs to further notify the terminal of which candidate value is to be selected. For example, similar to the foregoing embodiment, the base station notifies, through a scrambling ID or dedicated ID selection indication signaling, the terminal of which ID is to be selected. Definitely, in a situation of selective configuration of $N_{ID1}$, if one of notification manners of the scrambling ID and the dedicated ID selection indication signaling is adopted for $N_{ID1}$, the other notification manner is adopted for $N_{ID3}$ herein.

For example, the third ID has two candidate values, which are $N_{ID3\_0}$ and $N_{ID3\_1}$, and when the base station indicates a value of the third ID to the terminal according to the notification manner in Embodiment 2, that is, when the base station adopts the dedicated ID selection indication signaling, correspondence between values of Y in the dedicated ID selection indication signaling and values of $N_{ID3}$ is as follows:

$$\begin{cases} Y = 0, & N_{ID3} = N_{ID3\_0} \\ Y = 1 & N_{ID3} = N_{ID3\_1} \end{cases}$$

When the base station indicates a value of the third ID to the terminal according to the notification manner in Embodiment 1, that is, through a scrambling ID, correspondence between scrambling IDs and the values of $N_{ID3}$ is as follows:

$$\begin{cases} n_{SCID} = 0, & N_{ID3} = N_{ID3\_0} \\ n_{SCID} = 1 & N_{ID3} + N_{ID3\_1} \end{cases}$$

In specific implementation of this embodiment, if the scrambling ID is used for indicating a value of an ID used for generating a reference signal initialization sequence, for example, in an implementation manner of using the scrambling ID to indicate a value of $N_{ID1}$, or in an implementation manner of using the scrambling ID to indicate a value of $N_{ID3}$ and selecting a value for $N_{ID1}$, or in an implementation manner of using the scrambling ID to indicate a value of $N_{ID3}$ and fixedly configuring $N_{ID1}$ into a Group ID, a manner in which the base station determines an ID and a spread spectrum sequence used for generating a demodulation reference signal for terminals scheduled over the same time-frequency resource is the same as that in Embodiment 1.

In specific implementation of this embodiment, if the scrambling ID is not used for indicating a value of an ID used for generating a reference signal initialization sequence and is only used for indicating a scrambling ID for generating a reference signal initialization sequence, and the candidate IDs include the Group ID, a manner in which the base station determines, for terminals scheduled over the same time-frequency resource, an ID used for generating a reference signal initialization sequence, a spread spectrum sequence, and a scrambling ID is the same as that in Embodiment 2.

In this embodiment, in a specific implementation manner in which all the candidate IDs determined by the base station for the terminal do not include the Group ID, when the base station determines an ID used for generating a reference signal initialization sequence, and a spread spectrum sequence, or determines an ID, a spread spectrum sequence, and a scrambling ID, for terminals scheduled over the same time-frequency resource, when the implementation manner in Embodiment 1 or Embodiment 2 is correspondingly adopted, the part in which a CoMP terminal is involved is excluded.

In this embodiment, specific implementation of other parts is implemented with reference to Embodiment 1 or Embodiment 2, which is not described herein again.

Exemplary Embodiment 8

In this embodiment, a formula for generating a reference signal initialization sequence is different from that in Embodiment 7:

$$c_{init} = (\lfloor n_s/2 \rfloor + 1) \cdot (2N_{ID1} + 1) \cdot 2^{16} + XN_{ID2} + ZN_{ID3} + n_{SCID} \quad \text{Formula 20}$$

$N_{ID1}$ and $N_{ID2}$ may be fixedly configured into the same value or different values among the Cell ID, or a cell group ID or an RRH group ID in the Group ID, or 0, and may also be selectively configured into the same value or different values among the Cell ID, or a cell group ID or an RRH group ID in the Group ID, or 0. A method of selective configuration may be implemented with reference to the manner in any one of Embodiment 3 to Embodiment 6, which is not described herein again. Values of X and Z are the same as those of X and Z involved in the foregoing embodiment. $N_{ID3}$ is a third ID, and a candidate value configuration solution of the third ID and an indication solution related to the third ID of the base station are the same as the candidate value configuration solution and the indication solution of the third ID in specific Embodiment 7.

The remaining implementation manners of this embodiment are the same as those in Embodiment 7, which are not described herein again.

Persons of ordinary skill in the art should understand that all or a part of the steps of the method embodiments may be implemented by a program instructing relevant hardware. The program may be stored in a computer-readable storage medium. When the program is executed, the contents of the foregoing embodiments of the present invention are performed. The storage medium here may be, for example, a ROM/RAM, a magnetic disk, or an optical disk.

Figure 5:
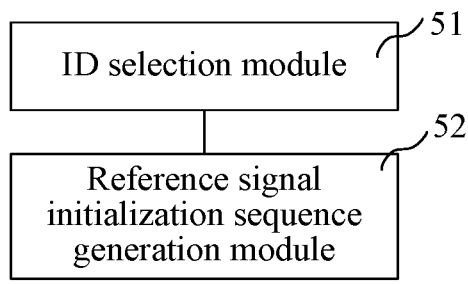
FIG. 5 is a schematic structural diagram of an embodiment of a network device according to the present invention.

An embodiment of the present invention further provides a network device, and as shown in FIG. 5, the network device includes:

an ID selection module 51, configured to select, from candidate IDs, an ID used for generating a reference signal initialization sequence for a terminal, where the candidate IDs include at least two IDs, and the selected ID does not include a scrambling ID; and a reference signal initialization sequence generation module 52, configured to generate a reference signal initialization sequence for the terminal according to the ID selected by the ID selection module 51.

A formula for the reference signal initialization sequence generation module 52 to generate the reference signal initialization sequence for the terminal may be:

$$c_{init}=(\lfloor n_s/2 \rfloor+1)\cdot(2N_{ID1}+1)\cdot 2^{16}+n_{SCID}$$

$n_s$ is a time slot number, $n_{SCID}$ is a scrambling ID, and $N_{ID}$ is the ID used for generating the reference signal initialization sequence and selected for the terminal from the candidate IDs. The candidate IDs include: a combination of any two or any more than two of a cell ID, an RRH ID, a cell group ID, an RRH group ID, a terminal group ID, a CSI-RS ID, a CSI-RS group ID, an antenna cluster ID, and one or more than one constant ID.

Alternatively, the formula for generating the reference signal initialization sequence may be:

$$c_{init}=(\lfloor n_s/2 \rfloor+1)\cdot(2N_{ID1}+1)\cdot 2^{16}+XN_{ID2}+n_{SCID}$$

$n_s$ is a time slot number, X is a positive integer greater than or equal to 1, and $n_{SCID}$ is a scrambling ID. A value of one of $N_{ID1}$ and $N_{ID2}$ is 0, and the other one is the ID used for generating the reference signal initialization sequence and selected for the terminal from the candidate IDs. Alternatively, $N_{ID1}$ and $N_{ID2}$ are different IDs used for generating a reference signal initialization sequence and selected for the terminal from the candidate IDs. The candidate IDs include: a combination of any two or any more than two of an RRH ID, a cell group ID, an RRH group ID, a terminal group ID, a CSI-RS ID, a CSI-RS group ID, an antenna cluster ID, and one or more than one constant ID.

Alternatively, the formula for generating the reference signal initialization sequence may be:

$$c_{init}=(\lfloor n_s/2 \rfloor+1)\cdot(2N_{ID1}+1)\cdot 2^{16}+ZN_{ID3}+n_{SCID}$$

$n_s$ is a time slot number, Z is a positive integer greater than or equal to 1, and $n_{SCID}$ is a scrambling ID.

$N_{ID1}$ is a fixedly configured ID, where the fixedly configured ID is: a cell ID, an RRH ID, a cell group ID, an RRH group ID, a terminal group ID, a CSI-RS ID, a CSI-RS group ID, an antenna cluster ID, or a constant ID. $N_{ID3}$ is an ID selected for the terminal from third ID candidate values, where the third ID candidate values include: a combination of any two or any more than two of an RRH ID, a cell group ID, an RRH group ID, a terminal group ID, a CSI-RS ID, a CSI-RS group ID, an antenna cluster ID, and one or more than one constant ID, or the third ID candidate values include: two or more than two terminal group related IDs; or the third ID candidate values include: two or more than two RRH group related IDs; or the third ID candidate values include: two or more than two CSI-RS group related IDs; or the third ID candidate values include: two or more than two antenna cluster related IDs; or the third ID candidate values include a combination of any two or any more than two of IDs in the candidate IDs, IDs in terminal group related IDs, RRH group related IDs, IDs in CSI-RS group related IDs, and IDs in antenna cluster related IDs.

Alternatively, $N_{ID3}$ is a fixedly configured ID, where the fixedly configured ID is: a cell ID, an RRH ID, a cell group ID, an RRH group ID, a terminal group ID, a CSI-RS ID, a CSI-RS group ID, an antenna cluster ID, or a constant ID; and $N_{ID1}$ is an ID selected for the terminal from first ID candidate values, where the first ID candidate values include: a combination of any two or any more than two of the cell ID, the RRH ID, the cell group ID, the RRH group ID, the terminal group ID, the CSI-RS ID, the CSI-RS group ID, the antenna cluster ID, and one or more than one constant ID.

Alternatively, $N_{ID1}$ is an ID selected for the terminal from first ID candidate values, where the first ID candidate values include: a combination of any two or any more than two of a cell ID, an RRH ID, a cell group ID, an RRH group ID, a terminal group ID, a CSI-RS ID, a CSI-RS group ID, an antenna cluster ID, and a constant ID; and $N_{ID3}$ is an ID selected for the terminal from third ID candidate values, where the third ID candidate values include: a combination of any two or any more than two of an RRH ID, a cell group ID, an RRH group ID, a terminal group ID, a CSI-RS ID, a CSI-RS group ID, an antenna cluster ID, and one or more than one constant ID; or the third ID candidate values include: two or more than two terminal group related IDs; or the third ID candidate values include: two or more than two RRH group related IDs; or the third ID candidate values include: two or more than two CSI-RS group related IDs; or the third ID candidate values include: two or more than two antenna cluster related IDs; or the third ID candidate values include a combination of any two or any more than two of IDs in the candidate IDs, IDs in the terminal group related IDs, the RRH group related IDs, IDs in the CSI-RS group related IDs, and IDs in the antenna cluster related IDs.

Alternatively, the formula for generating a reference signal initialization sequence may be:

$$c_{init}=(\lfloor n_s/2 \rfloor+1)\cdot(2N_{ID1}+1)\cdot 2^{16}+XN_{ID2}+ZN_{ID3}+n_{SCID}$$

$n_s$ is a time slot number, X and Z are both positive integers greater than or equal to 1, and $n_{SCID}$ is a scrambling ID.

$N_{ID1}$ is a fixedly configured ID, where the fixedly configured ID is: a cell ID, an RRH ID, a cell group ID, an RRH group ID, a terminal group ID, a CSI-RS group ID, an antenna cluster ID or a constant ID, and any one of an antenna cluster ID and a constant ID, or 0. $N_{ID2}$ is a fixedly configured ID, where the fixedly configured ID is: a cell ID, an RRH ID, a cell group ID, an RRH group ID, a terminal group ID, a CSI-RS group ID, an antenna cluster ID or a constant ID. $N_{ID3}$ is an ID selected for the terminal from third ID candidate values, where the third ID candidate values include: a combination of any two or any more than two of an RRH ID, a cell group ID, an RRH group ID, a terminal group ID, a CSI-RS ID, a CSI-RS group ID, an antenna cluster ID, and one or more than one constant ID;

or the third ID candidate values include: two or more than two terminal group related IDs; or the third ID candidate values include: two or more than two RRH group related IDs; or the third ID candidate values include: two or more than two CSI-RS group related IDs; or the third ID candidate values include: two or more than two antenna cluster related IDs; or the third ID candidate values include a combination of any two or any more than two of the IDs in the candidate IDs, IDs in the terminal group related IDs, the RRH group related IDs, IDs in the CSI-RS group related IDs, and IDs in the antenna cluster related IDs.

Alternatively, $N_{ID3}$ is a fixedly configured ID, where the fixedly configured ID is: a cell ID, an RRH ID, a cell group ID, an RRH group ID, a terminal group ID, a CSI-RS group ID, an antenna cluster ID, or a constant ID; $N_{ID1}$ is an ID selected for the terminal from first ID candidate values, where the first ID candidate values include: a combination of any two or any more than two of the cell ID, the RRH ID, the cell group ID, the RRH group ID, the terminal group ID, the CSI-RS ID, the CSI-RS group ID, the antenna cluster ID, and one or more than one constant ID; and $N_{ID2}$ is an ID selected for the terminal from second ID candidate values, where the second ID candidate values include: a combination of any two or any more than two of the cell ID, the RRH ID, the cell group ID, the RRH group ID, the terminal group ID, the CSI-RS group ID, the antenna cluster ID, and one or more than one constant ID.

Alternatively, $N_{ID1}$ is an ID selected for the terminal from first ID candidate values, where the first ID candidate values include: a combination of any two or any more than two of a cell ID, an RRH ID, a cell group ID, an RRH group ID, a terminal group ID, a CSI-RS group ID, an antenna cluster ID, and one or more than one constant ID; $N_{ID2}$ is an ID selected for the terminal from second ID candidate values, where the second ID candidate values include: a combination of any two or any more than two of a cell ID, an RRH ID, a cell group ID, an RRH group ID, a terminal group ID, a CSI-RS ID, a CSI-RS group ID, an antenna cluster ID, and a constant ID; and $N_{ID3}$ is an ID selected for the terminal from third ID candidate values, where the third ID candidate values include: a combination of any two or any more than two of an RRH ID, a cell group ID, an RRH group ID, a terminal group ID, a CSI-RS ID, a CSI-RS group ID, an antenna cluster ID, and one or more than one constant ID; or the third ID candidate values include: two or more than two terminal group related IDs; or the third ID candidate values include: two or more than two RRH group related IDs; or the third ID candidate values include: two or more than two CSI-RS group related IDs; or the third ID candidate values include: two or more than two antenna cluster related IDs; or the third ID candidate values include a combination of any two or any more than two of IDs in the candidate IDs, IDs in the terminal group related IDs, the RRH group related IDs, IDs in the CSI-RS group related IDs, and IDs in the antenna cluster related IDs.

The terminal group related IDs are IDs generated by the network device according to indication information of a terminal set; the CSI-RS group related IDs are IDs generated by the network device according to CSI-RS configuration information; the antenna cluster related IDs are IDs generated according to antenna cluster serial numbers; the RRH group related IDs are IDs generated by the network device according to RRH serial numbers; and the terminal group related IDs are IDs generated by the network device according to indication information of a terminal set.

The network device may be a base station, and may also be a terminal.

Figure 6A:
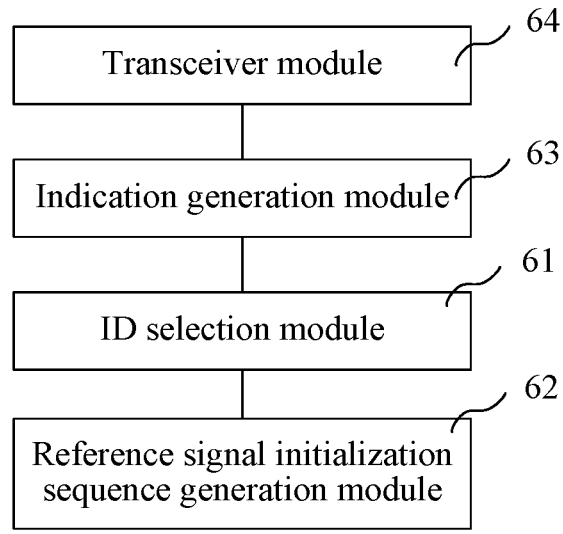
FIG. 6*a* to FIG. 6*d* are four schematic structural diagrams of an embodiment of a base station according to the present invention.

When the network device is a base station, as shown in FIG. 6a, the base station includes:

an ID selection module 61, configured to select, from candidate IDs, an ID used for generating a reference signal initialization sequence for a terminal, where the candidate IDs include at least two IDs, and the selected ID does not include a scrambling ID; and a reference signal initialization sequence generation module 62, configured to generate a reference signal initialization sequence for the terminal according to the ID selected by the ID selection module;

an indication generation module 63, configured to generate a reference signal initialization sequence generation indication according to the ID selected by the ID selection module 61; and a transceiver module 64, configured to deliver the reference signal initialization sequence generation indication generated by the indication generation module to the terminal, so that the terminal can generate a reference signal initialization sequence according to the indication.

Figure 6B:
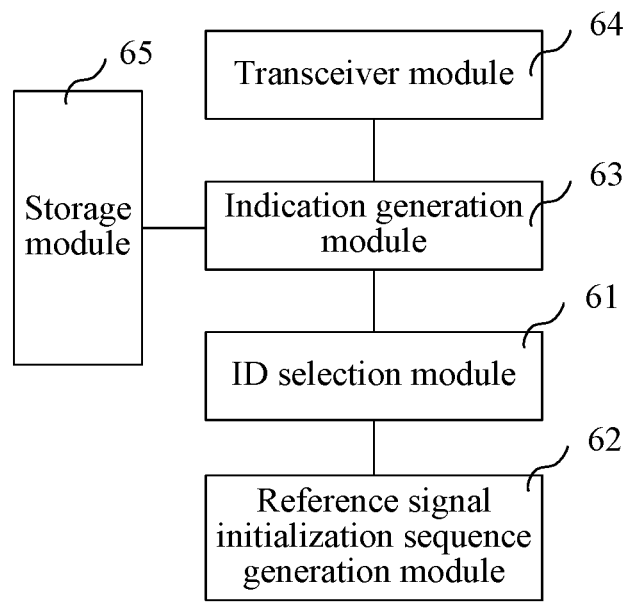

As shown in FIG. 6b, the base station may further include: a storage module 65.

The reference signal initialization sequence generation indication includes: DMRS port signaling; and the indication generation module 63 is configured to generate the DMRS port signaling according to the ID selected for the terminal, and correspondence between scrambling IDs and candidate IDs and a DMRS port configuration table that are stored in the storage module 65.

Alternatively, the reference signal initialization sequence generation indication includes: dedicated ID selection indication signaling; and the indication generation module 63 is configured to determine one or more than one ID indication identifier value according to the ID selected for the terminal and correspondence between one or more than one ID indication identifier value and candidate IDs that is stored in the storage module 65, and generate the dedicated ID selection indication signaling according to the determined ID indication identifier value.

Alternatively, the reference signal initialization sequence generation indication includes: DMRS port signaling and dedicated ID selection indication signaling; and the indication generation module 63 is configured to determine one or more than one ID indication identifier value according to the ID selected for the terminal and correspondence between one or more than one ID indication identifier value and candidate IDs that is stored in the storage module 65, generate the dedicated ID selection indication signaling according to the determined ID indication identifier value, and determine the DMRS port signaling according to the ID selected for the terminal, a port configuration table stored in the storage module 65, and correspondence between scrambling IDs and candidate IDs that is stored in the storage module 65.

Alternatively, the reference signal initialization sequence generation indication includes: DMRS port signaling and more than one piece of dedicated ID selection indication signaling; and the indication generation module 63 is configured to determine a scrambling ID used for indicating the terminal, and more than one ID indication identifier value, according to the ID selected for the terminal and correspondence that is set by the indication generation module 63 for each ID and stored in the storage module 65, generate the DMRS port signaling according to the determined scrambling ID and a DMRS port configuration table stored in the storage module 65, and generate the dedicated ID selection indication signaling according to the determined ID indication identifier value. The correspondence set for each ID in the storage module 65 includes correspondence between scrambling IDs and candidate IDs and correspondence between ID indication identifier values and candidate IDs.

Figure 6C:
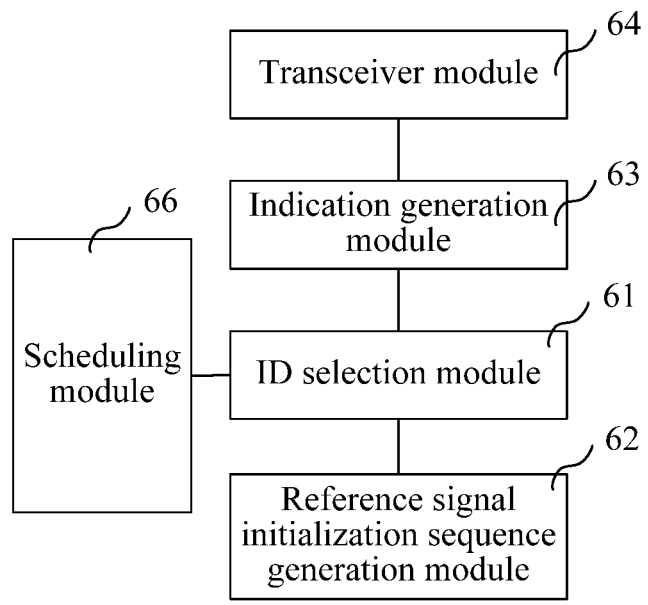
Figure 6D:
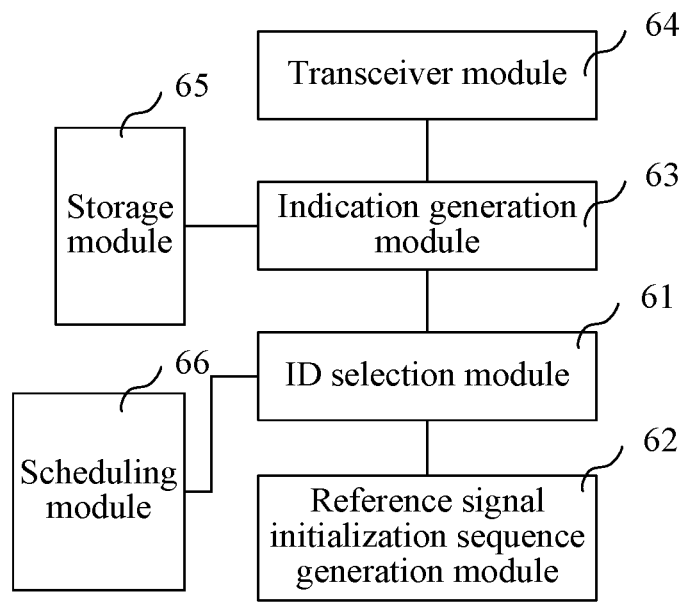

As shown in FIG. 6c or FIG. 6d, the base station may further include: a scheduling module 66, where the scheduling module 66 is configured to schedule, over the same time-frequency resource, multiple terminals including a MU-MIMO terminal, and send a first notification to the ID selection module 61; and the ID selection module 61 is further configured to preferentially select, for the terminal performing MU-MIMO and according to the first notification sent by the scheduling module, an ID used for generating a reference signal initialization sequence.

The scheduling module 66 may be further configured to send a second notification to the ID selection module 61 when it is determined that the terminal performing MU-MIMO include a CoMP terminal and a non-CoMP terminal.

The ID selection module 61 is further configured to, in the terminal performing MU-MIMO and according to the second notification sent by the scheduling module 66, preferentially select, for the CoMP terminal, an ID used for generating a reference signal initialization sequence, and select, for the non-CoMP terminal, an ID used for generating a reference signal initialization sequence the same as that selected for the CoMP terminal.

The ID selection module 61 is further configured to determine the candidate IDs. The candidate IDs determined by the ID selection module 61 may be candidate IDs for terminals to be scheduled, where the candidate IDs for the terminals to be scheduled are determined base on candidate IDs set by the base station by default, for example, a cell ID and a cell group ID (or a combination of any other two or more than two of the candidate IDs described in the above method embodiment). The ID selection module 61 may also generate the candidate IDs based on specific parameters, and reference can be specifically made to detailed description of generation of candidate IDs through parameters, for example, parameters such as a CSI-RS, in the method embodiment. The ID selection module 61 may also determine more than one constant ID as the candidate IDs by default. The ID selection module 61 may also determine the candidate IDs in any two manners or a combination of multiple manners in the various manners described above. For specific implementation of the various manners, reference can be made to relevant description of determination of the candidate IDs in the part of the method embodiment.

The transceiver module 64 may be further configured to deliver the determined constant IDs to the terminal through high-layer signaling. Definitely, the transceiver module 64 may also be further configured to deliver the specific parameters used for generating the candidate IDs to the terminal, or deliver other determined candidate IDs to the terminal. Specifically, in the method embodiment, all solutions involved in delivery of information by the base station to the terminal are performed by the transceiver module 64, and the remaining involved processing solutions are performed by corresponding modules according to steps performed in the solutions.

Figure 7A:
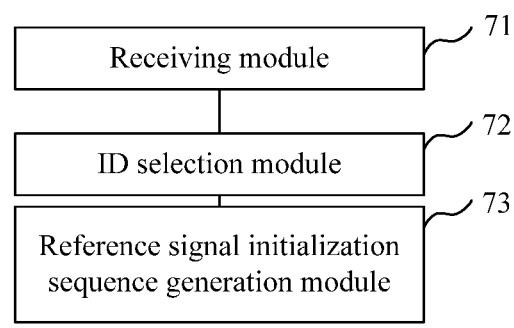
FIG. 7*a* to FIG. 7*b* are two schematic structural diagrams of an embodiment of a terminal according to the present invention.

When the network device is a terminal, as shown in FIG. 7a, the terminal includes:

a receiving module 71, configured to receive a reference signal initialization sequence generation indication from a base station;

an ID selection module 72, configured to select, from candidate IDs according to the indication received by the receiving module 71, an ID used for generating a reference signal initialization sequence for the terminal, where the candidate IDs include at least two IDs, and the selected ID does not include a scrambling ID; and a reference signal initialization sequence generation module 73, configured to generate a reference signal initialization sequence for the terminal according to the ID selected by the ID selection module 72.

Figure 7B:
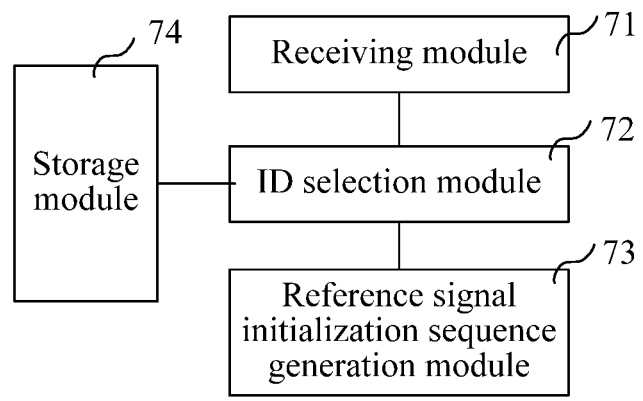

As shown in FIG. 7b, the terminal may further include: a storage module 74.

The reference signal initialization sequence generation indication received by the receiving module 71 includes: DMRS port signaling; and the ID selection module 72 is configured to determine a scrambling ID according to the DMRS port signaling received by the receiving module 71 and a DMRS port configuration table stored in the storage module 74, and determine the ID used for generating the reference signal initialization sequence according to the determined scrambling ID and correspondence between scrambling IDs and candidate IDs that is stored in the storage module 73.

Alternatively, the reference signal initialization sequence generation indication includes: dedicated ID selection indication signaling; and the ID selection module 72 is configured to determine the ID used for generating the reference signal initialization sequence according to an ID indication identifier value in the dedicated ID selection indication signaling received by the receiving module 71 and correspondence between ID indication identifier values and candidate IDs that is stored in the storage module 73.

Alternatively, the reference signal initialization sequence generation indication includes: DMRS port signaling and dedicated ID selection indication signaling; and the ID selection module 72 is configured to determine the ID used for generating the reference signal initialization sequence according to an ID indication identifier value in the dedicated ID selection indication signaling received by the receiving module 71, correspondence between ID indication identifier values and candidate IDs that is stored in the storage module 73, the DMRS port signaling received by the receiving module 71, a DMRS port configuration table stored in the storage module 73, and correspondence between scrambling IDs and candidate IDs that is stored in the storage module 73.

Alternatively, the reference signal initialization sequence generation indication includes: DMRS port signaling and more than one piece of dedicated ID selection indication signaling; and the ID selection module 72 is configured to determine the ID used for generating the reference signal initialization sequence according to each ID indication identifier value in the dedicated ID selection indication signaling received by the receiving module 71, correspondence between ID indication identifier values in the dedicated ID selection indication signaling and candidate IDs that is stored in the storage module 73, the DMRS port signaling received by the receiving module 71, a DMRS port configuration table stored in the storage module 73, and correspondence between scrambling IDs and candidate IDs that is stored in the storage module 73.

The ID selection module 72 in the terminal may be further configured to determine the candidate IDs. Specifically, a solution for the ID selection module 72 in the terminal to determine the candidate IDs corresponds to the solution for the base station to determine candidate IDs. For example, if the base station generates the candidate IDs based on certain specific parameters and sends these specific parameters to the terminal, the receiving module 71 in the terminal sends these specific parameters to the ID selection module 72 after receiving these specific parameters. Based on these specific parameters, the ID selection module 72 generates the candidate IDs in a manner the same as that of the base station. In another example, if the base station sets the candidate IDs to a cell ID and a cell group ID by default, the terminal also sets the candidate IDs to the cell ID and the cell group ID by default. The ID selection module 72 determines the cell ID and the cell group ID received from the base station as the candidate IDs. Other specific determination manners are not listed herein one by one, and in specific implementation, reference can be made to relevant description in the method embodiment or the base station embodiment described above.

The network device, including the base station or the terminal, may further include:

a demodulation reference signal generation module, configured to generate a demodulation reference signal according to the reference signal initialization sequence generated by the reference signal initialization sequence generation module, for the terminal to perform channel estimation.

In the embodiments of the present invention, an ID used for generating a demodulation initialization sequence is selected for the terminal from candidate IDs, and more manners of generating a reference signal initialization sequence are provided. In the solution that the base station sends a reference signal initialization sequence generation indication to the terminal through the dedicated ID selection indication signaling, on the basis that different demodulation reference signal sequences are determined for different terminals through scrambling codes, it is added that more types of reference signal initialization sequences can be generated for the terminal by selecting different IDs, thereby increasing system capacity. Moreover, the same ID used for generating a reference signal initialization sequence is selected for the CoMP terminal and the non-CoMP terminal performing MU-MIMO, or different IDs but the same spread spectrum sequence are selected, so that the CoMP terminal and the non-CoMP terminal are orthogonal to each other, thereby ensuring implementation of the MU-MIMO and improving the performance of the terminal.

Although the present invention is shown and described with reference to some exemplary embodiments of the present invention, persons of ordinary skill in the art should understand that various changes in forms and details may be made to the present invention without departing from the spirit and scope of the present invention.

The invention claimed is:

1. A method for configuring a reference signal sequence, the method comprising:
   generating, by a base station, a reference signal initialization sequence for a terminal according to a first identifier (ID) and a scrambling ID, wherein the first ID is an ID among candidate IDs, the candidate IDs comprise at least a cell ID and two constant IDs, and the scrambling ID is associated with at least one of the candidate IDs;
   determining, by the base station, a signaling indicating the scrambling ID; and
   sending, by the base station, a downlink scheduling signaling including the signaling to the terminal, wherein the signaling is a reference signal initialization sequence generation indication of the terminal that indicates the scrambling ID to the terminal.

2. The method according to claim 1, wherein the reference signal initialization sequence is a function of the first ID and the scrambling ID.

3. The method according to claim 1, wherein the first ID corresponds to the scrambling ID, and the determining, by the base station, the signaling comprises:
   determining, by the base station, the signaling according to the scrambling ID and a relationship between the signaling and the scrambling ID.

4. The method according to claim 1, wherein the two constant IDs are determined by the base station and are sent to the terminal through high-layer signaling.

5. The method according to claim 1, wherein the scrambling ID is one of a plurality of scrambling IDs, and each of the scrambling IDs corresponds to at least one of the candidate IDs.

6. The method according to claim 1, wherein when the first ID is one of the constant IDs;
   the reference signal initialization sequence fulfills:

$$c_{init}=(\lfloor n_s/2 \rfloor+1) \cdot (2N_{ID1}+1) \cdot 2^{16}+ZN_{ID3}+n_{SCID}$$

wherein $n_s$ is a time slot number, Z is a positive integer greater than or equal to 1, $n_{SCID}$ is the scrambling ID, and $N_{ID1}$ and $N_{ID3}$ are among the constant IDs;
   or, the reference signal initialization sequence fulfills:

$$c_{init}=(\lfloor n_s/2 \rfloor+1) \cdot (2N_{ID1}+1) \cdot 2^{16}+XN_{ID2}+ZN_{ID3}+n_{SCID}$$

wherein $n_s$ is a time slot number, X and Z are both positive integers greater than or equal to 1, $n_{SCID}$ is the scrambling ID,
   $N_{ID1}$ and $N_{ID2}$ are among the constant IDs, and $N_{ID3}$ is a cell ID, an RRH ID, a cell group ID, an RRH group ID, a terminal group ID, a CSI-RS group ID, an antenna cluster ID, or a constant ID; or $N_{ID3}$ is an ID from a third ID candidate values,
   wherein the third ID candidate values comprise: a combination of any two or any more than two of an RRH ID, a cell group ID, an RRH group ID, a terminal group ID, a CSI-RS ID, a CSI-RS group ID, an antenna cluster ID, and one or more than one constant ID; or the third ID candidate values comprise: two or more than two terminal group related IDs; or
   the third ID candidate values comprise: two or more than two RRH group related IDs; or
   the third ID candidate values comprise: two or more than two CSI-RS group related IDs; or
   the third ID candidate values comprise: two or more than two antenna cluster related IDs; or
   the third ID candidate values comprise a combination of any two or any more than two of IDs in the candidate IDs, IDs in the terminal group related IDs, the RRH group related IDs, IDs in the CSI-RS group related IDs, and IDs in the antenna cluster related IDs; wherein the terminal group related IDs are IDs generated by the network device according to indication information of a terminal set; the CSI-RS group related IDs are IDs generated by the network device according to CSI-RS configuration information; the antenna cluster related IDs are ID generated according to antenna cluster serial numbers; the RRH group related IDs are IDs generated by the network device according to RRH serial numbers; and the terminal group related IDs are IDs generated by the network device according to indication information of a terminal set;
   or, $N_{ID1}$ and $N_{ID3}$ are among the constant IDs, and $N_{ID2}$ is an ID from a second ID candidate values, wherein the second ID candidate values comprise: a combination of any two or any more than two of a cell ID, an RRH ID, a cell group ID, an RRH group ID, a terminal group ID, a CSI-RS ID, a CSI-RS group ID, an antenna cluster ID, and a constant ID;

or, $N_{ID2}$ and $N_{ID3}$ are among the constant IDs, and $N_{ID1}$ is an ID from a first ID candidate values, wherein the first ID candidate values comprise: a combination of any two or any more than two of a cell ID, an RRH ID, a cell group ID, an RRH group ID, a terminal group ID, a CSI-RS ID, a CSI-RS group ID, an antenna cluster ID, and one or more than one constant ID.

7. A base station comprising:

a processor coupled to a memory storing instructions that, when executed by the processor, cause the processor to perform operations comprising:

generating a reference signal initialization sequence for a terminal according to a first identifier (ID) and a scrambling ID, wherein the first ID is an ID among candidate IDs, the candidate IDs comprise at least a cell ID and two constant IDs, and the scrambling ID is associated with at least one of the candidate IDs; and determining a signaling indicating the scrambling ID;

a transmitter configured to send a downlink scheduling signaling including the signaling to the terminal, wherein the signaling is the reference signal initialization sequence generation indication of the terminal that indicates the scrambling ID to the terminal.

8. The base station according to claim 7, wherein the reference signal initialization sequence is a function of the first ID and the scrambling ID.

9. The base station according to claim 7, wherein the first ID corresponds to the scrambling ID, and the determining the signaling comprises:

determining the signaling according to the scrambling ID and a relationship between the signaling and the scrambling ID.

10. The base station according to claim 7, wherein the two constant IDs are determined by the processor and are sent to the terminal by the transmitter through high-layer signaling.

11. The base station according to claim 7, wherein the scrambling ID is one of a plurality of scrambling IDs, and each of the scrambling IDs corresponds to at least one of the candidate IDs.

12. The base station according to claim 7, wherein when the first ID is one of the constant IDs;

the reference signal initialization sequence fulfills:

$c_{init}=(\lfloor n_s/2 \rfloor+1)\cdot(2N_{ID1}+1)\cdot 2^{16}+ZN_{ID3}+n_{SCID}$ wherein $n_s$ is a time slot number, Z is a positive integer greater than or equal to 1, $n_{SCID}$ is the scrambling ID, and $N_{ID1}$ and $N_{ID3}$ are among the constant IDs;

or, the reference signal initialization sequence fulfills:

$c_{init}=(\lfloor n_s/2 \rfloor+1)\cdot(2N_{ID1}+1)\cdot 2^{16}+XN_{ID2}+ZN_{ID3}+n_{SCID}$ wherein $n_s$ is a time slot number, X and Z are both positive integers greater than or equal to 1, $n_{SCID}$ is the scrambling ID, $N_{ID1}$ and $N_{ID2}$ are among the constant IDs, and $N_{ID3}$ is a cell ID, an RRH ID, a cell group ID, an RRH group ID, a terminal group ID, a CSI-RS group ID, an antenna cluster ID, or a constant ID; or $N_{ID3}$ is an ID from a third ID candidate values, wherein the third ID candidate values comprise: a combination of any two or any more than two of an RRH ID, a cell group ID, an RRH group ID, a terminal group ID, a CSI-RS ID, a CSI-RS group ID, an antenna cluster ID, and one or more than one constant ID; or the third ID candidate values comprise: two or more than two terminal group related IDs; or the third ID candidate values comprise: two or more than two RRH group related IDs; or the third ID candidate values comprise: two or more than two CSI-RS group related IDs; or the third ID candidate values comprise: two or more than two antenna cluster related IDs; or the third ID candidate values comprise a combination of any two or any more than two of IDs in the candidate IDs, IDs in the terminal group related IDs, the RRH group related IDs, IDs in the CSI-RS group related IDs, and IDs in the antenna cluster related IDs; wherein the terminal group related IDs are IDs generated by the network device according to indication information of a terminal set; the CSI-RS group related IDs are IDs generated by the network device according to CSI-RS configuration information; the antenna cluster related IDs are ID generated according to antenna cluster serial numbers; the RRH group related IDs are IDs generated by the network device according to RRH serial numbers; and the terminal group related IDs are IDs generated by the network device according to indication information of a terminal set;

or, $N_{ID1}$ and $N_{ID3}$ are among the constant IDs, and $N_{ID2}$ is an ID from a second ID candidate values, wherein the second ID candidate values comprise: a combination of any two or any more than two of a cell ID, an RRH ID, a cell group ID, an RRH group ID, a terminal group ID, a CSI-RS ID, a CSI-RS group ID, an antenna cluster ID, and a constant ID;

or, $N_{ID2}$ and $N_{ID3}$ are among the constant IDs, and $N_{ID1}$ is an ID from a first ID candidate values, wherein the first ID candidate values comprise: a combination of any two or any more than two of a cell ID, an RRH ID, a cell group ID, an RRH group ID, a terminal group ID, a CSI-RS ID, a CSI-RS group ID, an antenna cluster ID, and one or more than one constant ID.

13. A non-transitory computer-readable storage medium having programming instructions stored thereon which, when executed by a processor, cause the processor to perform operations comprising:

receiving a downlink scheduling signaling including a signaling from a base station, wherein the signaling indicates a scrambling identifier (ID), wherein the scrambling ID is associated with at least one of candidate IDs, and the candidate IDs comprise at least a cell ID and two constant IDs;

determining the scrambling ID according to the signaling;

selecting a first ID for generating a reference signal initialization sequence from candidate IDs according to the scrambling ID and the association between the scrambling ID and the at least one of the candidate IDs; and generating a reference signal initialization sequence according to the first ID and the scrambling ID.

14. The non-transitory computer-readable storage medium according to claim 13, wherein the reference signal initialization sequence is a function of the first ID and the scrambling ID.

15. The non-transitory computer-readable storage medium according to claim 13, wherein the two constant IDs are received through high-layer signaling from the base station.

16. The non-transitory computer-readable storage medium according to claim 13, wherein the first ID corresponds to the scrambling ID; and selecting the first ID comprises:
   determining the scrambling ID according to the signaling; and
   selecting the first ID from candidate IDs according to the scrambling ID.

17. The non-transitory computer-readable storage medium according to claim 13, wherein the scrambling ID is one of a plurality of scrambling IDs, and each of the plurality of scrambling IDs corresponds to at least one of the candidate IDs.

18. The non-transitory computer-readable storage medium according to claim 13, wherein when the first ID is one of the constant IDs;
   the reference signal initialization sequence fulfills:

$$c_{init}=(\lfloor n_s/2 \rfloor+1)\cdot(2N_{ID1}+1)\cdot2^{16}+ZN_{ID3}+n_{SCID}$$

wherein $n_s$ is a time slot number, Z is a positive integer greater than or equal to 1, $n_{SCID}$ is the scrambling ID, and $N_{ID1}$ and $N_{ID3}$ are among the constant IDs;
   or, the reference signal initialization sequence fulfills:

$$c_{init}=(\lfloor n_s/2 \rfloor+1)\cdot(2N_{ID1}+1)\cdot2^{16}+XN_{ID2}+ZN_{ID3}+n_{SCID}$$

wherein $n_s$ is a time slot number, X and Z are both positive integers greater than or equal to 1, $n_{SCID}$ is the scrambling ID,
   $N_{ID1}$ and $N_{ID2}$ are among the constant IDs, and $N_{ID3}$ is a cell ID, an RRH ID, a cell group ID, an RRH group ID, a terminal group ID, a CSI-RS group ID, an antenna cluster ID, or a constant ID; or $N_{ID3}$ is an ID from a third ID candidate values,
      wherein the third ID candidate values comprise: a combination of any two or any more than two of an RRH ID, a cell group ID, an RRH group ID, a terminal group ID, a CSI-RS ID, a CSI-RS group ID, an antenna cluster ID, and one or more than one constant ID; or
      the third ID candidate values comprise: two or more than two terminal group related IDs; or
      the third ID candidate values comprise: two or more than two RRH group related IDs; or
      the third ID candidate values comprise: two or more than two CSI-RS group related IDs; or
      the third ID candidate values comprise: two or more than two antenna cluster related IDs; or
      the third ID candidate values comprise a combination of any two or any more than two of IDs in the candidate IDs, IDs in the terminal group related IDs, the RRH group related IDs, IDs in the CSI-RS group related IDs, and IDs in the antenna cluster related IDs; wherein the terminal group related IDs are IDs generated by the network device according to indication information of a terminal set; the CSI-RS group related IDs are IDs generated by the network device according to CSI-RS configuration information; the antenna cluster related IDs are ID generated according to antenna cluster serial numbers; the RRH group related IDs are IDs generated by the network device according to RRH serial numbers; and the terminal group related IDs are IDs generated by the network device according to indication information of a terminal set;
   or, $N_{ID1}$ and $N_{ID3}$ are among the constant IDs, and $N_{ID2}$ is an ID from a second ID candidate values, wherein the second ID candidate values comprise: a combination of any two or any more than two of a cell ID, an RRH ID, a cell group ID, an RRH group ID, a terminal group ID, a CSI-RS ID, a CSI-RS group ID, an antenna cluster ID, and a constant ID;
   or, $N_{ID2}$ and $N_{ID3}$ are among the constant IDs, and $N_{ID1}$ is an ID from a first ID candidate values, wherein the first ID candidate values comprise: a combination of any two or any more than two of a cell ID, an RRH ID, a cell group ID, an RRH group ID, a terminal group ID, a CSI-RS ID, a CSI-RS group ID, an antenna cluster ID, and one or more than one constant ID.

* * * * *

UNITED STATES PATENT AND TRADEMARK OFFICE
CERTIFICATE OF CORRECTION

PATENT NO. : 10,863,367 B2  
APPLICATION NO. : 16/196268  
DATED : December 8, 2020  
INVENTOR(S) : Liu et al.

Page 1 of 1

It is certified that error appears in the above-identified patent and that said Letters Patent is hereby corrected as shown below:

In the Claims

Claim 7: Column 31, Line 22: "and" should be deleted.

Claim 7: Column 31, Line 23: "determining a signaling indicating the scrambling ID;" should read -- determining a signaling indicating the scrambling ID; and --.

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*